United States Patent [19]
Kamezaki et al.

[11] Patent Number: 5,199,988
[45] Date of Patent: Apr. 6, 1993

[54] MANUFACTURING APPARATUS AND METHOD FOR RECORDING MEDIUM

[75] Inventors: Hisamitsu Kamezaki, Ibaraki; Osamu Saito, Takatsuki; Yoshitane Tsuburaya, Toride, all of Japan

[73] Assignee: Hitachi Maxell, Ltd., Osaka, Japan

[21] Appl. No.: 395,578

[22] Filed: Aug. 18, 1989

[30] Foreign Application Priority Data

Aug. 19, 1988 [JP] Japan .................. 63-204788
Sep. 20, 1988 [JP] Japan .................. 63-233620
Nov. 10, 1988 [JP] Japan .................. 63-282478
Mar. 24, 1989 [JP] Japan .................. 1-070398

[51] Int. Cl.$^5$ ............................ B05C 11/02
[52] U.S. Cl. ............................ 118/52; 118/50
[58] Field of Search ......... 427/240, 162, 146, 150, 427/377, 290; 118/50, 52

[56] References Cited
U.S. PATENT DOCUMENTS

| | | | |
|---|---|---|---|
| 4,492,718 | 1/1985 | Mayer et al. | 427/240 |
| 4,510,176 | 4/1985 | Cuthbert et al. | 427/240 |
| 4,522,846 | 6/1985 | Mayer et al. | 427/54.1 |
| 4,584,259 | 4/1986 | Mayer et al. | 427/160 |
| 4,592,939 | 6/1986 | Temple et al. | 427/162 |
| 4,800,836 | 1/1989 | Yamamoto et al. | 118/52 |
| 4,886,012 | 12/1989 | Ikeno et al. | 118/52 |
| 4,889,069 | 12/1989 | Kawakami | 118/52 |

FOREIGN PATENT DOCUMENTS 0183297 11/1985 European Pat. Off.

OTHER PUBLICATIONS

Patent Abstracts of Japan vol. 10, No. 34 (P-427) (2901) Feb. 8, 1986, and JP-A-62-182534 (Matsushita Denki Sangyo K.K) Sep. 18, 1985.
Patent Abstracts of Japan, vol. 9, No. 270 (E-353) (1993) Oct. 26, 1985, and JP-A-60-115224 (Fuji Xerox K.K.) Jun. 21, 1985.
Patent Abstracts of Japan vol. 10, No. 65 (E-388) (2122) Mar. 14, 1986, and JP-A-60-217627 (Hitachi Seisakusho K.K.) Oct. 31, 1985.
Patent Abstracts of Japan vol. 10, No. 148 (C-350) May 29, 1986, and JP-A-61-005794 (Sumitomo Kagaku Kogyo K.K.) Jan. 11, 1986.
Patent Abstracts of Japan vol. 13, No. 275 (C-610) (3623) Jun. 23, 1989, and JP-A-01-070168 (Hitachi Ltd.) Mar. 15, 1989.
IBM Technical Disclosure Bulletin, vol. 17, No. 11, p. 3281, Apr., 1975 entitled Controlled gap photoresist spinning process.
IBM Technical Disclosure Bulletin, vol. 19, No. 6, p. 2115, Nov. 1976 entitled Remover for Peripheral Resist Build-ups.
Patent Abstracts of Japan, vol. 11, No. 365 (C-460) (2812) Nov. 27, 1987, & JP-A-62-136265 (Matsushita Electric Ind. Co. Ltd) Jun. 19, 1987.
English Abstract of Japanese Ref.: 61-5794 (59-206077).

*Primary Examiner*—Janyce Bell
*Attorney, Agent, or Firm*—Birch, Stewart, Kolasch & Birch

[57] ABSTRACT

An apparatus for producing an optical data recording medium comprising a turn table adapted to support a substrate of the recording medium and a nozzle for dropping a coating liquid onto the substrate, the coating liquid dropped on the substrate being spread over the substrate by a rotational force of the turn table to form a coating layer, the apparatus being provided with a gas flow suppressing type housing which is partitioned off from the atmosphere so as to suppress the convection current flowing, due to the rotation of the turn table, toward a central portion of the substrate and further toward the outer circumferential portion thereof along a top surface of the substrate and to suppress the evaporation of a solvent of the coating liquid into the atmosphere, the nozzle being arranged above the inner circumferential portion of the substrate with its end portion being directed to the outer circumferential portion of the substrate, the end portion of the nozzle being inclined so as to form an angle less than 90 degrees relative to the substrate as viewed from a side of the substrate, the coating liquid application being carried out in a hermetically sealed atmosphere within a sealed chamber.

8 Claims, 30 Drawing Sheets

FIG. 7

| COMPOUND NO. | R | R' | —A— | —B— | -(T)= | X |
|---|---|---|---|---|---|---|
| 1 | CH₃ | CH₃ | I | H₃C\C/CH₃ | II | PF₆ |
| 2 | CH₃ | CH₃ | IV | H₃C\C/CH₃ | II | PF₆ |
| 3 | CH₃ | CH₃ | V | H₃C\C/CH₃ | II | PF₆ |
| 4 | CH₃ | CH₃ | XII | H₃C\C/CH₃ | I | PF₆ |
| 5 | CH₃ | CH₃ | XVI | H₃C\C/CH₃ | I | PF₆ |
| 6 | C₂H₅ | C₂H₅ | I | H₃C\C/CH₃ | I | PF₆ |
| 7 | C₂H₅ | C₂H₅ | I | H₃C\C/CH₃ | III | PF₆ |
| 8 | C₂H₅ | C₂H₅ | IV | H₃C\C/CH₃ | III | PF₆ |
| 9 | C₂H₅ | C₂H₅ | XVI | H₃C\C/CH₃ | VII | PF₆ |
| 10 | C₃H₇ | C₃H₇ | I | H₃C\C/CH₃ | I | PF₆ |
| 11 | C₃H₇ | C₃H₇ | I | -CH=CH- | X | PF₆ |
| 12 | C₃H₇ | C₃H₇ | X | -S- | IV | PF₆ |
| 13 | (CH₂)₃SO₃H | (CH₂)₃SO₃H | I | H₃C\C/CH₃ | I | PF₆ |
| 14 | (CH₂)₂COOH | (CH₂)₂COOH | I | H₃C\C/CH₃ | I | PF₆ |
| 15 | (CH₂)₂OCH₃ | (CH₂)₂OCH₃ | I | H₃C\C/CH₃ | I | PF₆ |

FIG. 8

| COMPOUND NO. | R | R' | --A-- | ---B--- | -(T)= | X |
|---|---|---|---|---|---|---|
| 16 | $CH_3$ | $C_2H_5$ | I | $H_3C\underset{C}{\diagdown\diagup}CH_3$ | I | $PF_6$ |
| 17 | $CH_3$ | $C_3H_7$ | I | $H_3C\underset{C}{\diagdown\diagup}CH_3$ | I | $PF_6$ |
| 18 | $CH_3$ | $C_4H_9$ | I | $H_3C\underset{C}{\diagdown\diagup}CH_3$ | I | $PF_6$ |
| 19 | $CH_3$ | $C_5H_{11}$ | I | $H_3C\underset{C}{\diagdown\diagup}CH_3$ | I | $PF_6$ |
| 20 | $CH_3$ | $C_8H_{17}$ | I | $H_3C\underset{C}{\diagdown\diagup}CH_3$ | I | $PF_6$ |
| 21 | $CH_3$ | $C_{14}H_{29}$ | I | $H_3C\underset{C}{\diagdown\diagup}CH_3$ | I | $PF_6$ |
| 22 | $CH_{13}$ | $C_{18}H_{37}$ | I | $H_3C\underset{C}{\diagdown\diagup}CH_3$ | I | $PF_6$ |
| 23 | $C_2H_5$ | $C_3H_7$ | I | $H_3C\underset{C}{\diagdown\diagup}CH_3$ | I | $PF_6$ |
| 24 | $C_2H_5$ | $C_5H_{11}$ | I | $H_3C\underset{C}{\diagdown\diagup}CH_3$ | I | $PF_6$ |
| 25 | $C_2H_5$ | $C_8H_{17}$ | I | $H_3C\underset{C}{\diagdown\diagup}CH_3$ | I | $PF_6$ |
| 26 | $C_2H_5$ | $C_{14}H_{29}$ | I | $H_3C\underset{C}{\diagdown\diagup}CH_3$ | I | $PF_6$ |
| 27 | $C_3H_7$ | $C_5H_{11}$ | XVI | $H_3C\underset{C}{\diagdown\diagup}CH_3$ | I | $PF_6$ |
| 28 | $C_3H_7$ | $C_8H_{17}$ | XVI | $H_3C\underset{C}{\diagdown\diagup}CH_3$ | I | $PF_6$ |
| 29 | $C_3H_7$ | $C_{14}H_{29}$ | XVI | $H_3C\underset{C}{\diagdown\diagup}CH_3$ | I | $PF_6$ |

FIG. 9

| COM-POUND NO. | R | R' | --A-- | --B-- | -(T)= | X |
|---|---|---|---|---|---|---|
| 30 | CH$_3$ | C$_3$H$_7$ | — | H$_3$C\C/CH$_3$ | I | I |
| 31 | C$_2$H$_5$ | C$_5$H$_7$ | — | H$_3$C\C/CH$_3$ | I | I |
| 32 | CH$_3$ | C$_3$H$_7$ | — | H$_3$C\C/CH$_3$ | I | ClO$_4$ |
| 33 | C$_2$H$_5$ | C$_5$H$_7$ | — | H$_3$C\C/CH$_3$ | I | ClO$_4$ |
| 34 | C$_3$H$_7$ | C$_3$H$_7$ | — | H$_3$C\C/CH$_3$ | II | I |
| 35 | C$_3$H$_7$ | C$_3$H$_7$ | — | H$_3$C\C/CH$_3$ | II | ClO$_4$ |

FIG. 10

| COMPOUND NO. | LAYER THICKNESS (nm) | C/N (dB) | RESIDUAL LIGHT ABSORPTION (%) | NUMBER OF READOUTS |
|---|---|---|---|---|
| 1 | 58 | 51 | 85 | $0.9 \times 10^5$ |
| 2 | 56 | 51 | 83 | $0.8 \times 10^5$ |
| 3 | 57 | 52 | 86 | $0.9 \times 10^5$ |
| 4 | 60 | 50 | 81 | $0.7 \times 10^5$ |
| 5 | 55 | 49 | 85 | $1.1 \times 10^5$ |
| 6 | 57 | 51 | 84 | $1.0 \times 10^5$ |
| 7 | 56 | 53 | 91 | $2.3 \times 10^5$ |
| 8 | 58 | 52 | 89 | $1.9 \times 10^5$ |
| 9 | 61 | 50 | 83 | $2.1 \times 10^5$ |
| 10 | 55 | 53 | 86 | $1.1 \times 10^5$ |
| 11 | 57 | 51 | 85 | $1.7 \times 10^5$ |
| 12 | 54 | 51 | 84 | $0.5 \times 10^5$ |
| 13 | 59 | 49 | 79 | $0.6 \times 10^5$ |
| 14 | 56 | 50 | 80 | $0.7 \times 10^5$ |
| 15 | 60 | 50 | 81 | $0.6 \times 10^5$ |

FIG. 11

| COMPOUND NO. | LAYER THICKNESS (nm) | C N (dB) | RESIDUAL LIGHT ABSORPTION (%) | NUMBER OF READOUTS |
|---|---|---|---|---|
| 16 | 56 | 52 | 87 | $1.1 \times 10^5$ |
| 17 | 55 | 50 | 85 | $1.1 \times 10^5$ |
| 18 | 58 | 51 | 83 | $1.0 \times 10^5$ |
| 19 | 57 | 51 | 81 | $0.9 \times 10^5$ |
| 20 | 56 | 50 | 81 | $0.8 \times 10^5$ |
| 21 | 57 | 50 | 80 | $0.7 \times 10^5$ |
| 22 | 55 | 49 | 79 | $0.7 \times 10^5$ |
| 23 | 58 | 51 | 90 | $1.0 \times 10^5$ |
| 24 | 56 | 50 | 91 | $0.9 \times 10^5$ |
| 25 | 57 | 52 | 88 | $0.7 \times 10^5$ |
| 26 | 59 | 52 | 84 | $0.7 \times 10^5$ |
| 27 | 59 | 52 | 87 | $1.0 \times 10^5$ |
| 28 | 57 | 51 | 85 | $0.9 \times 10^5$ |
| 29 | 56 | 51 | 80 | $0.8 \times 10^5$ |

FIG. 12

| COMPOUND NO. | LAYER THICK- NESS (nm) | C N (dB) | RESIDUAL LIGHT ABSORPTION (%) | NUMBER OF READOUTS |
|---|---|---|---|---|
| 30 | 58 | 45 | 62 | $1.3 \times 10^3$ |
| 31 | 56 | 44 | 61 | $1.1 \times 10^3$ |
| 32 | 56 | 44 | 67 | $1.1 \times 10^4$ |
| 33 | 57 | 45 | 66 | $1.0 \times 10^4$ |
| 34 | 60 | 46 | 63 | $3.6 \times 10^3$ |
| 35 | 58 | 45 | 74 | $1.2 \times 10^4$ |

$d > 1.5 \times D$ $d_3 < 1.5 \times D$

FIG. 48
FIG. 49
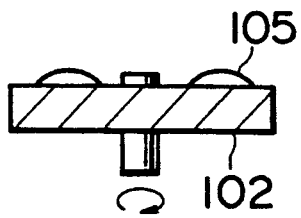
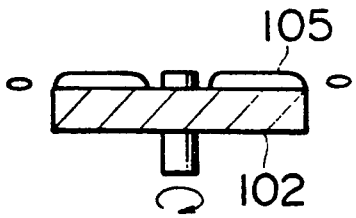
FIG. 50
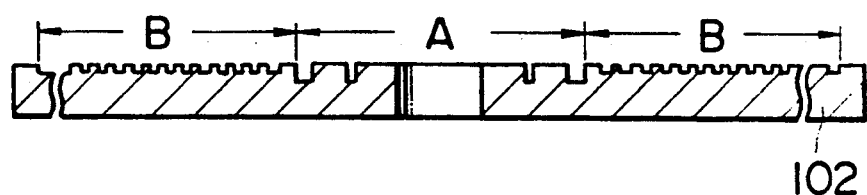
FIG. 51
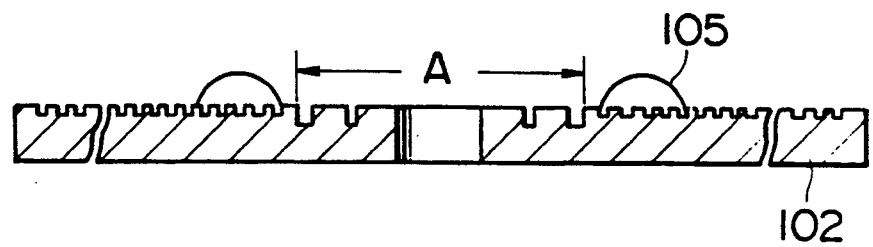
FIG. 52
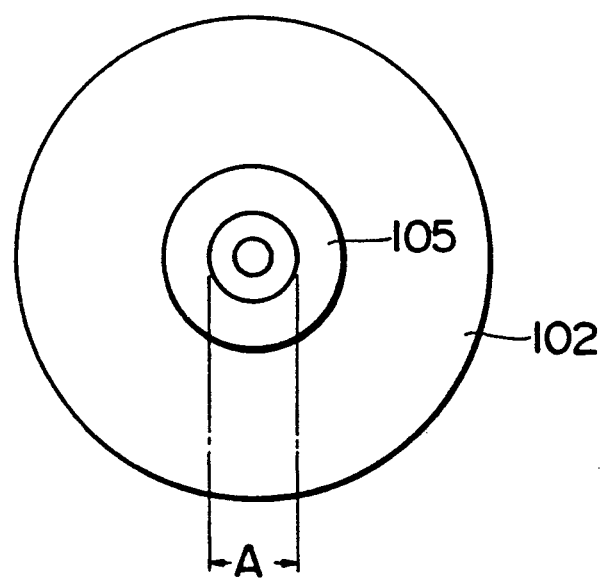

MANUFACTURING APPARATUS AND METHOD FOR RECORDING MEDIUM

BACKGROUND OF THE INVENTION

The present invention relates to an apparatus and a method for producing an optical data recording medium provided with a recording layer formed of an organic dye type recording material.

Recently, there has been developed an optical disc using an organic dye as the recording material whereby the productivity is improved by using a rotary coating method, i.e. a spin coating method, for producing a film.

Japanese Patent Unexamined Publication 61-129747 shows a conventional technique related to the spin coating method. This manufacturing technique is available for a recording material layer having an average film thickness in the range of from 0.035 to 0.14 micron. In this technique, control of the film thickness is carried out only by the RPM of the spin coat and concentration of the coating solution.

Also, there has been known an optical data recording disc on which a recording layer is formed of an organic dye type heat mode recording material. Since the recording layer of this optical data recording disc may be formed by the spin coating method, the manufacturing equipment therefor may be simplified in comparison with the case of using a vacuum film forming machine. Also, it is advantageous that the spin coating method leads to a high productivity.

FIG. 47 of the illustrations is a perspective view showing one example of a conventional spin coating apparatus to be used for producing such a kind of an optical data recording discs. A substrate 102 is horizontally mounted on a vertically placed rotary spindle 101. A nozzle 104 with a tip end 103 is arranged above a substrate 102 and the top end 103 is bent vertically toward the substrate 102 The nozzle 104 is held so that its tip end 103 may be moved from an inner circumferential portion to an outer circumferential portion of the substrate 102 as desired. The tip end 103 of the nozzle 104 is moved from the inner circumferential portion to the outer circumferential portion of the substrate 102 and simultaneously therewith a predetermined amount of a layer or film forming material is injected from the nozzle tip end 103, whereby the film forming material is coated uniformly on the substrate 102.

At present, the CD (compact disc) for reproducing music has been widely used. Since, however, the CD is used for reproduction only and does not have a so-called DRAW (direct read after write) function, a user cannot make a recording on such CDs or edit them. There is thus a strong demand for a CD having this DRAW function. Further, in the case of an optical disc having applications other than as a CD, a less expensive optical disc including the DRAW function is desired.

A metal material such as Te for a void type medium or a metal material such as In for a so-called phase changing type medium effecting dislocation from crystal to non-crystal is known to be used as an optical recording material having the DRAW function. Since, however, a recording layer composed of these metal type recording materials is formed by using a thin film formation technique such as a vapor-deposition method, a sputtering method or the like, there remains problems in mass-productivity and cost.

Thus, the spin coating method is considered to be desirable in increasing the productivity for forming a film.

As the spin coating method, there is a method for supplying material in a center of a disc by gravity, a downflow method, and a method for dropping material on an intermediate portion in a doughnut shape and removing extra material (Japanese Patent Examined Publication 61-5794).

The central dropping method is shown in FIGS. 48 and 49 in which a solution 105 is dropped in the central portion of the substrate 102 of the disc-like optical recording medium (FIG. 48), and immediately thereafter, the substrate is rotated at a high speed to thereby remove an excess of the solution 105 by the centrifugal force to form a film (FIG. 49).

In the downflow method, the nozzle is linearly moved from the outer periphery to the inner periphery (or from the inner periphery to the outer periphery) of the substrate 102, while rotating the substrate to drop the solution 105 and remove an excess of solution 105 to form a coating layer.

As shown in FIGS. 50, 51 and 52, in the high speed removing method, under the condition that the substrate 102 is initially rotated at a low speed or held in a stationary position, the solution 105 is dropped onto a portion around a clamp area A of the substrate. Thereafter, the substrate 102 is rotated at a high speed so that the excess of the solution 105 is removed from the substrate to form a coating layer.

Also, in the case where the coating liquid layer of the recording material is formed on prepits (having a width of 0.4 to 0.5 micron and a depth of about $\lambda/4$, where $\lambda$ is the wavelength of light) copied on a replica surface (copied layer) of a surface of the substrate 102 or pregrooves (guide grooves having a width of about 0.4 to 0.5 micron and a depth of about $\lambda/8$) by the spin coating method, or in the case where a coating liquid for a protective layer is applied, by the spin coating method, to the recording layer surface of the recording layer which has been dried to form a film, it is well known that the coating liquid layer formed by the spin coating or the coating layer formed after drying the recording layer is kept in the states shown in FIGS. 53 and 54.

Namely, it is known that a recess 110 of the prepit or the pregroove is filled with the recording layer material 3 so that no recess is formed in either the recording layer 3 or the protective layer 8a, or otherwise the recess is formed in the recording layer 3, but no recess is formed in the protective layer 8a.

In addition to the instant application, the present applicants have filed U.S. Appln. Ser. No. 367721 on Jun 19, 1989 and U.S. Appln. Ser. No. 380295 on Jul. 19, 1989.

According to the technique disclosed in the above-described Japanese Patent Unexamined Publication 61-129747, it is very difficult to control the thickness or uniformity of the film only by the RPM of the spin coat and the concentration of the coating solution. For example, in the case where a low boiling point solution is selected, evaporation of the solution is roped during the spin coating, to form a non-uniform film. Furthermore, a difference in film thickness between the inner and outer peripheral portions of the optical disc will lead to a change in the reflection factor or transparency to cause a tracking error or the like.

SUMMARY OF THE INVENTION

A primary object of the present invention is to overcome such defects inherent in the prior art and to provide an apparatus for producing an optical data recording medium, which may ensure a uniform thickness of the recording medium layer or film. In general, a uniformity in the order of 2 to 3 nm is needed for the recording layer of the optical data recording disc.

However, according to the above-described conventional spin coating apparatus, even if the spin coat conditions, such as an RPM of the substrate, rotational mode of the substrate, kind of recording layer material, viscosity of the coating solution of the recording layer, atmospheric condition in the apparatus and the like would be optimally selected, there would be a non-uniformity in thickness at least in the order of 8 to 10 nm. The reason therefor may be inferred as follows.

Namely, for example, when the coating liquid of the recording layer material is dropped onto the substrate 102, first of all, the coating liquid is spread over the substrate 102 under the balance of conditions of gravity, surface tension and the wettability of the substrate surface. Thereafter, the coating liquid is distributed toward the outer peripheral portion of the substrate 102 by centrifugal force. Since, in the above-described spin coating apparatus, the tip end 103 of the nozzle 104 is arranged vertically relative to the substrate 102, first, the solution is spread uniformly from the central drop portion to the adjacent portion thereof, and thereafter, the solution is distributed to the outer peripheral portion of the substrate 102. Accordingly, upon the drop of the solution, an amount of the solution that is fluidized in an opposite direction to the centrifugal direction is relatively large, so that the flow of the solution is complicated. As a result, the uniformity of the formed recording layer is deteriorated.

Although the foregoing description relates to the spin coating method for the recording layer, it will be understood that a similar problem is raised in the case where another thin film layer, such as the undercoat layer, of the recording layer and the hard coat layer on the substrate surface is formed by the spin coating method.

Therefore, a second object of the present invention is to provide an apparatus for producing an optical data recording medium, which may ensure the uniform thickness of the film with ease, in the same manner as the primary object while overcoming such defects of the conventional apparatus.

Also, in accordance with the foregoing central drop method, the solution 105 shown in FIG. 49 is dropped on the portion near the central portion of the substrate 102, and thereafter, the solution 105 is expanded over the substrate 102 by centrifugal force to form a film. Accordingly, an amount of the solution 105 is likely to be insufficient in the inner peripheral portion of the substrate. As a result, the solution is not spread uniformly. It is disadvantageous if the thickness of the solution is non-uniform between the inner and outer peripheral portions of the substrate 102.

In the above-described downflow method and the high speed removing method, the defects of the central dropping method may be overcome. However, there is still another problem. Namely, the size (width, depth) of a signal pattern of a prepit and a guide groove formed in the surface of the substrate 102 is actually extremely fine, the solution 105 has a viscosity to some extent, and the substrate is not easily wettable by the solution (in particular, water). Thus, the fine recesses (pits or guide grooves) in the substrate surface are not well filled with the solution 105. Therefore, the thickness of the film is not uniform or a pin hole is formed, which adversely effects the recording and reproducing property.

In order to overcome the above-noted defects, a third object of the present invention is to provide a method for producing an optical data recording medium, which has a uniform film thickness without any pin holes and which is superior in reproduction property.

On the other hand, in the optical disc having prepits, as explained in conjunction with FIGS. 53 and 54, in general, the modulation of a data reproduction signal obtained by irradiating a reproduction laser beam onto the prepits from the prepits is very low. In, for example, an optical disc having an organic dye type recording film using an indol cyanine type dye for a recording layer 3 and using a polyvinyl alcohol for the protective layer 8a, such a low modulation cannot be practically used. Namely, the reproduction signal from the prepits includes many errors, and at worst, it is impossible to read out the signal at all.

In order to overcome the defects of the foregoing prior art, a fourth object of the invention is to provide an optical data recording medium provided with prepits and pregrooves formed through spin coating, so that a reproduction signal may be obtained from the prepits and pregrooves with a very small error and with a high modulation by irradiating the reproduction laser beam.

A fifth object of the invention is to provide a method for controlling the operational condition of the spin coating method and the spin coating apparatus, which may form the above-described prepits and pre-grooves.

In order to attain the first object of the invention, according to one aspect of the invention, there is provided an apparatus for producing an optical data recording medium, comprising a turntable for supporting a substrate and a nozzle for dropping a coating liquid onto the substrate to spread the coating liquid over the substrate by the rotational force of the turntable. In general, a gas on the substrate flows toward the central portion of the substrate by the rotation of the turntable, and further flows along the surface of the substrate toward the outer peripheral portion of the substrate. The present invention is characterized by comprising a gas flow suppressing means for suppressing such a gas flow.

According to the provision of the gas flow suppressing means, the adverse effect of the gas flow above the turntable, generated by the rotation of the turntable, may be eliminated to thereby form a film having a uniform thickness.

In order to attain the second object of the invention, according to another aspect of the invention, there is provided a manufacturing apparatus in which a nozzle for supplying a thin film forming coating material onto the substrate is arranged at a position confronting the inner peripheral portion of the substrate. The tip end of the nozzle is directed to the outer peripheral portion of the substrate as viewed from above the substrate and the tip end of the nozzle is inclined so as to form an angle with the substrate as viewed from a side of the nozzle at less than 90 degrees.

With such an arrangement, since the tip end of the nozzle is arranged to be directed in the same direction as that of the centrifugal force, when the solution is dropped on the substrate, a large amount of the solution is spread in the centrifugal force direction so that an amount of the solution that is spread in the opposite direction to the centrifugal direction is relatively small. Accordingly, the flow of the solution toward the outer periphery of the substrate is smooth to form a thin film having a uniform thickness.

Also, it is unnecessary to move the nozzle in the radial direction of the substrate. It is therefore possible to make the nozzle setting portion compact in size. Accordingly, since the substrate and the nozzle may be encased in a small size sealing case, it is possible to form a thin film having a uniform thickness.

In order to attain the third object of the invention, according to still another aspect of the present invention, a coating liquid film, such as a polyvinyl alcohol water solution, is formed over the entire recording area of the substrate and signal pattern recesses composed of corrugated prepits in the recording area of the substrate are filled with the coating liquid. Thereafter, the substrate is rotated at a high speed so that any extra coating liquid is removed from the substrate to form a coating film.

The liquid film coating is formed over the entire recording area of the substrate and the substrate is held in a stationary state or revolving at an extremely low speed, whereby a sufficient amount of coating liquid may be filled in the recesses (such as guide grooves and prepits) of the signal pattern of the recording area. As a result, it is possible to form a coating film having a uniform thickness without any pin hole.

In order to attain the fourth object of the invention, according to still another embodiment there is provided an apparatus for producing an optical data recording medium with a spinner coating as described before, which is characterized in that a spinner coating apparatus is provided with a housing 15 inside which is disposed a turntable 11 connected to a rotary shaft of a motor 9, a disc substrate and a coating liquid injection nozzle 10, which housing is hermetrically sealed from the outer atmosphere, as shown in FIGS. 16A, 16B, 16C, 16D, 30, 35 and the like. According to the instant invention, the substrate having one side surface onto which prepits and pregrooves are transferred and formed is fixed to the turntable 11 within the housing 15 from which the outside atmosphere is excluded, with the surface in which the prepits and pregrooves are formed being directed upward. Under the condition that the rotation of the substrate is stopped or effected at a very low speed, the coating liquid is uniformly applied to the entire surface which needs the coating for the prepits and pregrooves of the substrate, so that the recesses of the prepits and pregrooves of the substrate are filled with the coating liquid. Thereafter, the substrate is rotated at a high speed to centrifugally remove any excess of the coating liquid to form a coating layer.

In the case where the coating liquid is a recording layer material such as an organic dye, the spin coating is carried out in accordance with the coating mode shown in FIG. 20, to form a layer having a concave cross section, as shown in FIG. 56. In the case where a protective layer is to be formed on the recording layer, the coated liquid layer shown in FIG. 56 is first dried. Subsequently, the coating liquid for the protective layer is applied in accordance with the modes shown in FIGS. 43, 44 and 45 to form a layer having a concave cross section, as shown in FIG. 55. The spin coating for the protective layer comprises, in the order, a step for spreading the coating surface from the inner side to the outer side of the disc substrate, a step for disposing and entering the coating liquid, and a step for centrifugally removing any excess of the coating liquid. A period of time tc for spreading the coating liquid from the inner side to the outer side of the coating surface of the disc substrate and a period of time tE for disposing and entering the coating liquid on the coating layer are varied depending upon the composition of the protective layer coating liquid. For example, a) if the time period tE for the case where polyvinyl alcohol (PVA) water solution is applied to a recording film layer of cyanine is a short period of time, about 1 to 10 seconds, it is possible to eliminate any adverse effect of the dissolving of the cyanine dye of the recording layer into the protective layer liquid; b) In the case where the coating liquid of PVA water solution into which ammonium bichromate or the like is added as an additive is applied to a recording film layer of cyanine dye, the period tE should be about 1 to 30 seconds during which time no adverse effect would experienced.

With the spin coating method of the present invention, it is possible to form the pre-pits shown in FIGS. 55 and 56. Such formation will be described with reference to FIG. 57A.

FIG. 57A is an schematic diagram for explanation of energy reflectivity R. Assuming here that $\gamma_{12}$ and $t_{12}$ respectively, represent the amplitude reflectance and the amplitude transmittance of light which passes from medium 1 to medium 2, amplitude reflectance $\gamma_{12}$ and amplitude transmittance $t_{12}$ in the case of vertical or normal incidence can be expressed as follows in terms of refractive indexes $n_1$ and $n_2$ of the mediums 1 and 2.

$$\gamma_{12} = n_2 - n_1 / n_1 + n_2 \quad (1)$$

$$t_{12} = 2n_1 / n_1 + n_2 \quad (2)$$

Energy reflectivity R can be expressed in terms of the amplitude reflectance $\gamma$:

$$ti\ R = 51\ \gamma|^2 \quad (3).$$

More specifically, when the incident wave is expressed by $a_0 \cos\theta$ and the composite wave of the reflected waves is expressed by $a'\cos(\theta + \Delta)$, energy reflectivity R can be expressed by the following equation.

$$R = (a'/a_0)^2 \quad (4)$$

By using the above relations, the operation for finding the energy reflectivities under the following conditions is made:

| | |
|---|---|
| $n_0$ | reflective index of air ($n_0 = 1$) |
| $n_1$ | reflective index of polycarbonate ($n_1 = 1.6$) |
| $n_2$ | reflective index of dye ($n_2 = 2.7$) |
| $n_3$ | reflective index of thin layer ($n_3 = 1.5$) |
| $d_1$ | thickness of dye at bottom of pit portion |
| $d_2$ | thickness of thin layer at bottom of pit portion |
| $d_3$ | depth of pit portion |
| $d_4$ | thickness of dye on land portion |
| $d_5$ | thickness of thin layer on land portion |
| $\lambda$ | 830 nm. |

Reflected lights $A_1$–$A_6$ at the respective boundary surfaces can be expressed as follows:

$$A_1 = \gamma_{12} \cdot \cos\theta$$

-continued $$A_2 = t_{12} \cdot \gamma_{23} \cdot t_{21} \cdot \cos\left(\theta + \frac{4\pi n_2 d_1}{\lambda}\right)$$

$$A_3 = t_{12} \cdot t_{23} \cdot \gamma_{30} \cdot t_{32} \cdot t_{21} \cdot \cos\left[\theta + \frac{4\pi(n_2 \cdot d_1 + n_3 \cdot d_2)}{\lambda}\right]$$

$$A_4 = \gamma_{12} \cdot \cos\left(\theta + \frac{4\pi n_1 \cdot d_3}{\lambda}\right)$$

(The phase is shifted by $\gamma_{12} \cdot \cos \theta + d_3$.)

$$A_5 = t_{12} \cdot \gamma_{23} \cdot t_{21} \cdot \cos\left[\theta + \frac{4\pi(n_1 \cdot d_3 + n_2 \cdot d_4)}{\lambda}\right]$$

$$A_6 = t_{12} \cdot t_{23} \cdot \gamma_{30} \cdot t_{32} \cdot t_{21} \cdot$$

$$\cos\left[\theta + \frac{4\pi(n_1 \cdot d_3 + n_2 \cdot d_4 + n_3 \cdot d_5)}{\lambda}\right].$$

Accordingly, with the use of the above reflected lights, the composite wave can be expressed by: $A_1 + A_2 + A_3 + A_4 + A_5 + A_6 = a'\cos(\theta + \Delta)$. Because of $a_0 = 1$, the energy reflectivity R can be found by finding $a'$.

An example of the above will be given as follows. When taking the pre-pit portion as the example, the thicknesses of the layers on the land portion $d_4$ and $d_5$ are set respectively to the values of 40 nm and 25 nm which are optimum for obtaining the maximum reflectivity and the maximum sensitivity of recording, and the depth of the pit portion $d_3$ is 200 nm. Consideration is made of the influence of the thicknesses $d_1$, $d_2$ on the energy reflectivity R under this condition. Even when applying the spin coating method of the invention, the thicknesses $d_1$, $d_2$ in the pre-pit portion become somewhat larger than the thicknesses $d_4$, $d_5$, or $d_1 > d_4$ and $d_2 > d_5$.

In view of the above, relation between $d_1$ and R is shown in FIG. 57A. As will be seen from the drawing, reflection is high around 200 nm of $d_1$ to deteriorate the contrast as is in a conventional art. Whereas, the contrast is the best at $d_1$ of 100 nm, though the ratio of contrast is sufficient for practical use if it takes the relative value of 60% and more. This means that the reflection of about 12% from the bottom of the pit portion is negligible. Thus, $d_1$ of 60 nm is optimum. Further, regarding $d_2$, the relation thereof to R is shown in FIG. 57C, wherein $d_1$ is fixed to 60 nm. From the illustrated result, it will be understood that the contrast becomes better within the region of $d_2 > 75$ nm. It is matter of course that as $d_3$ is set to 200 nm, $d_1 + d_2$ does never become larger than 200 nm.

The energy reflectivity R has been described with reference to FIGS. 57B and 57C. It should be noted, however, that the relations shown in these drawings are given only for exemplification and vary depending on the factors of $n_0-n_3$, $d_1-d_5$ and $\lambda$, while the relations shown are the most preferable example. Also, as to the shape of the pit portion, those shown in FIGS. 55 and 56 are preferable.

BRIEF DESCRIPTION OF THE DRAWINGS

In the accompanying drawings:

FIGS. 7 and 8 are diagrams showing specific examples of organic dyes used in the embodiments;

FIG. 9 is a diagram showing comparison examples of the organic dyes;

FIGS. 10, 11, 12 and 13 show various characteristics of the material;

FIGS. 16A to 16D are schematic cross-sectional views showing spinner coating apparatuses;

FIGS. 48 and 49 are views illustrating the center dropping method;

FIG. 50 is a cross-sectional view of a substrate;

FIGS. 51 and 52 are a cross-sectional view and a plan view illustrating the conventional coating method;

DESCRIPTION OF THE PREFERRED EMBODIMENTS

The present invention will now be described with reference to the accompanying drawings.

Figure 1:
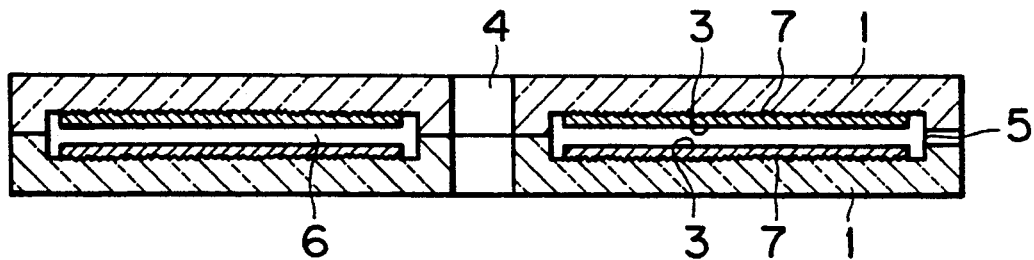
FIG. 1 is a longitudinal sectional view showing an air sandwich type optical disc in accordance with a first embodiment of the invention.
Figure 2:
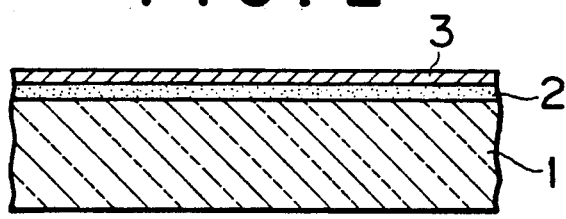
FIG. 2 is an enlarged sectional view showing a primary part of the optical disc shown in FIG. 1.

FIG. 1 is a cross-sectional view showing an air sandwich type optical disc in accordance with a first embodiment of the invention, and FIG. 2 is an enlarged sectional view showing a primary part of the optical disc.

The optical disc comprises a disc-like substrate 1, an undercoat 2 (see FIG. 2), a recording layer 3, a central hole 4 and a vent hole 5. As shown in FIG. 1, two optical discs are bonded together to form an air gap 6 in the inside thereof. Signal patterns 7 such as pregrooves and prepits are formed in the disc substrate 1.

The disc substrate 1 is made of transparent material such as polycarbonate, polymethyl methacrylate, polymethyl penten, epoxy resin, glass or the like.

The undercoat 2 is made of a self-oxidation material, such as polyvinyl nitrate.

A heat mode recording material of an organic dye type for the recording layer 3 may be composed, for example of a polymethyne dye, an anthraquinone dye, a cyanine dye, a phthalocyanine dye, a xanthene dye, a tri-phenyl methane dye, a pyrilium dye, an axulene dye, a metal containing azo dye and the like. Also, a photochromic material may be composed of dyes such as fulgide, spyropyran, tetrabenzopentacene, thioindigo and the like.

Also, as desired, a self-oxidation resin such as nitrocellulose or the like or a dye composition containing a thermoplastic resin such as polystyrene, nylon or the like, may be used as these dyes. The recording material composition is dissolved in a solution such as ketone, ester, ether, aromatic, halide, alcohol, aliphatic, aliphatic ring, petroleum, and water solution and is spin coated on the substrate.

In the organic dyes, in particular, the indole type cyanine dye is stable against light and heat and hence is preferable. The organic dye has the following general formula.

General formula

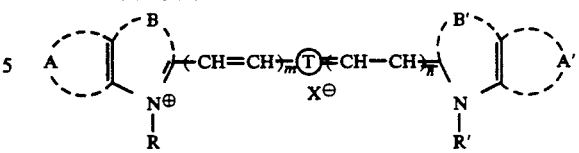

In the formula, (T) is a carbon chain to form a methyne chain and composed of a linear chain or polycyclic compound of $C_3$–$C_{17}$, and a hydrogen atom attached to a carbon atom may be substituted by a halogen atom,

(R″ is a linear chain of $C_1$–$C_6$ or an aromatic ring).

A may be equal to or different from A′ and both of them represent an aromatic ring, respectively. A hydrogen atom attached to a carbon atom may be substituted by —I, —Br, —Cl, —$C_nH_{2n+1}$ (n=1–12), —$OCH_3$,

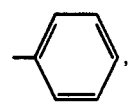

—$NO_2$, and

(R‴ is a linear chain of a hydrocarbon or aromatic ring).

B may be equal to or different from B′ and both of them represent —O—, —S—, —Se—, —CH=CH—, or

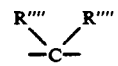

(R″″ is an alkyl group of $C_1$–$C_4$ such as $CH_3$, $C_2H_5$, $C_3H_7$, and $C_4H_9$).

R may be equal to or different from R′, both of them represent an alkyl group $C_1$–$C_{22}$ and may be substituted by a sulfonyl group or a carboxyl group.

X⊕ represents an anion containing $PF_6^\oplus$, $ClO_4^\oplus$, $I^\oplus$, $CF_3SO_3^\oplus$, $SCN^\oplus$ and the like.

m and n represent zero or integer of 1 through 3, respectively and have a relationship of m+n≦3.

Figure 5:
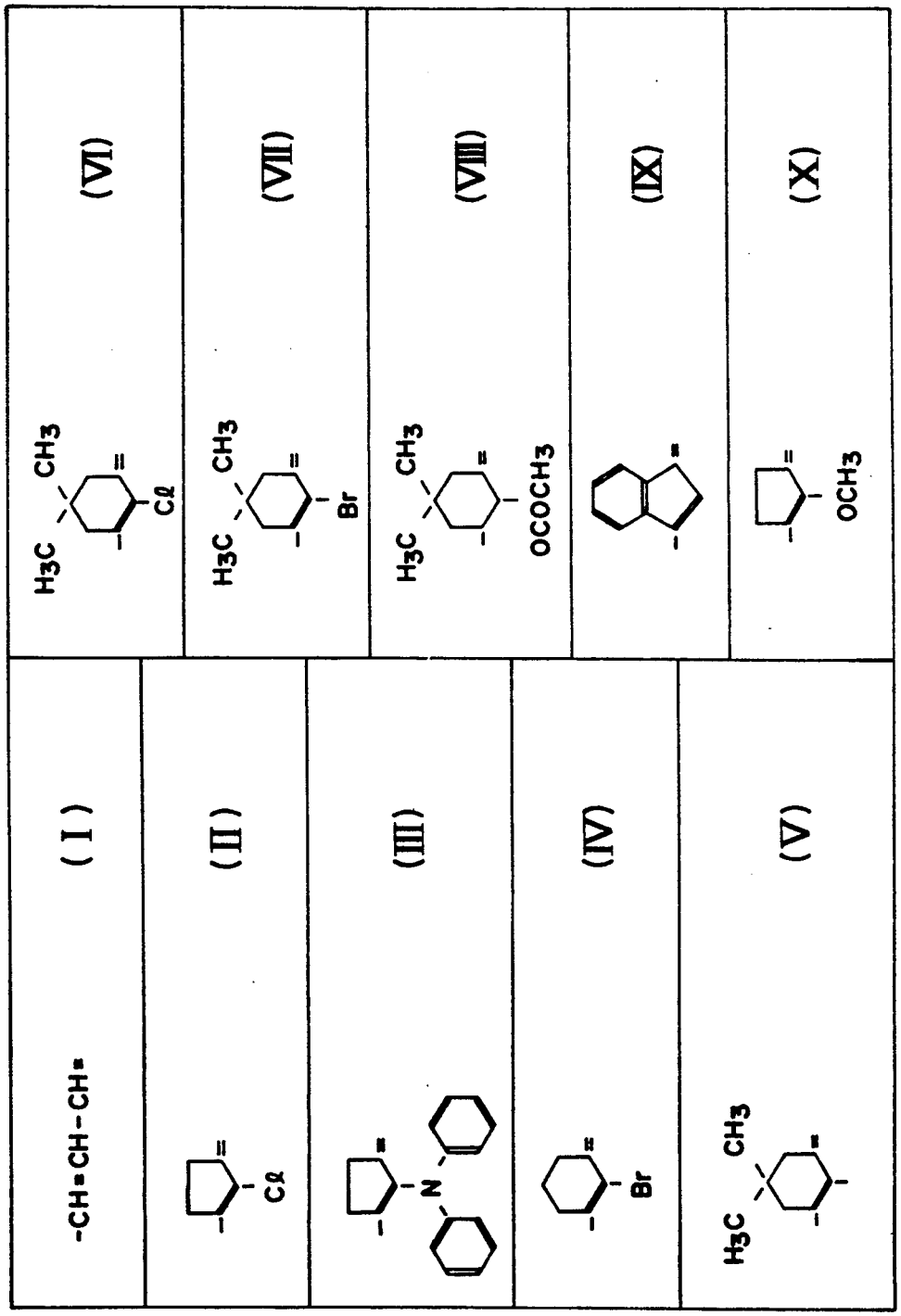
FIG. 5 is a diagram showing typical examples of Ⓣ in a general structural formula of organic dyes used in the embodiments.

While FIG. 5 shows typical examples of (T) in the general formula, suitable material having any formula other than these examples representing (T) may be used.

Figure 6:
FIG. 6 is a diagram showing typical examples of A and A' used in the general formula.

In addition, while FIG. 6 shows typical examples of A and A′ in the general formula, suitable material having any formula other than these examples representing A and A′ may be used.

1 wt % of each of the various organic dyes shown in FIGS. 7, 8 and 9 was dissolved in 1,2-dichloroethane and this solution was applied to a disk substrate composed of polymethyl methacrylate by a spinner method to form a recording layer and an optical disc was fabricated by a usual method. FIGS. 7 and 8 (chemical compounds No. 1 to 29) show organic dyes relating to respective examples of the invention; and FIG. 9 (chemical compounds Nos. 30 to 35) shows organic dyes relating to comparison examples.

Using the thus formed optical discs, recording and reproducing tests, thermal stability tests of the recording layers and lead light durability tests were conducted. The results are shown in FIGS. 10, 11 and 12.

In the recording and reproducing tests, a laser beam of 830 nm is used for writing signals with a power of 8 mW, a pulse width of 100 nS and a linear velocity 6.0 m/sec. A laser beam of 830 nm was used for writing signals and a C/N value (carrier/noise) was obtained by measuring with a power 1 mW.

For measuring the thermal stability of the recording layers, a UVIDEC-430B spectrometer made by Nippon Bunko was used, and light absorption at 830 nm before the tests was measured. This measured value was regarded as 100 and the rates of the residual light absorption at 830 nm after the heating at 80° C. for 1,500 hours were measured. The residual light absorption (%) are shown in FIG. 11.

For measuring the lead light durability, the signals were read out by using a laser beam of 830 nm and a power of 0.5 mW, and the number of readouts were measured until the reflection was reduced to 10%.

Various experiments prove that when ⓣ in the above general formula shown in FIGS. 7 and 8 is —CH=CH—CH= or

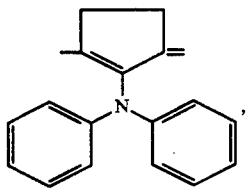

the heat resistance and recording sensitivity of the recording layer can be improved.

In addition, when A and A' in the above general formula is

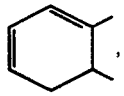

the reflection factor of the recording layer can be improved.

Further, when B and B' in the above general formula is

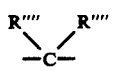

(R'''' is an alkyl group of $C_1$–$C_4$), the solubility of the organic dye can be increased.

Furthermore, when R and R' in the above general formula is an alkyl group of $C_3$–$C_5$, the reflection factor of the recording layer can be increased.

In particular, the cyanine dye, wherein ⓣ in the general formula is —CH=CH—CH=, A and A' are

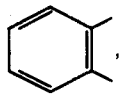

B and B' are

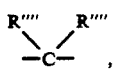

R and R' are $C_2H_5$ or $C_3H_7$, and $X^\oplus$ is $PF_6^\oplus$, has an excellent heat resistance, recording sensitivity, reflection factor and solubility and then can be advantageously used.

Figure 13:
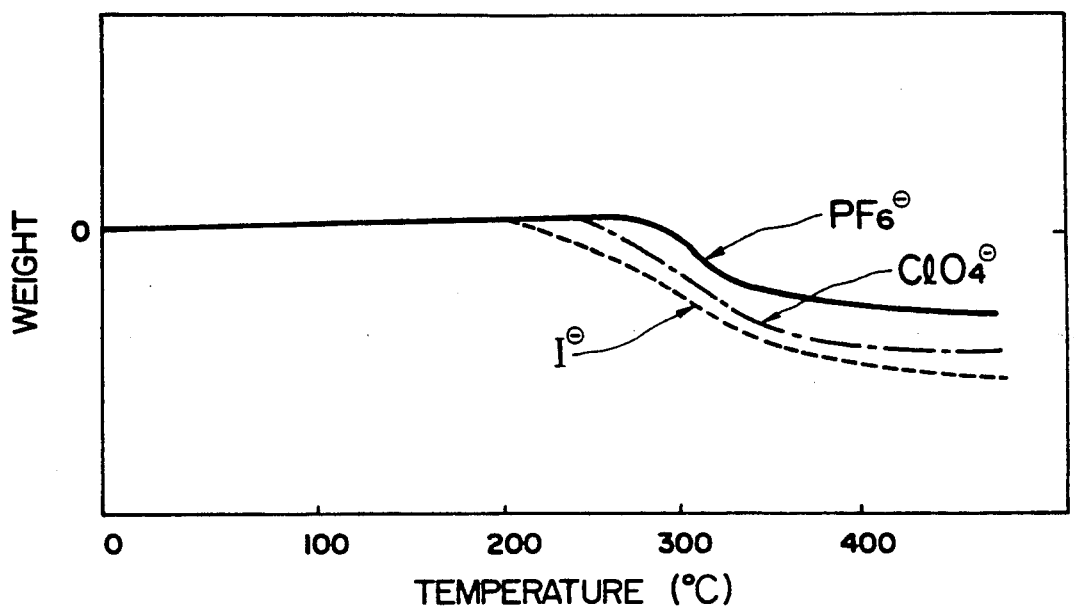

Next, an indole type cyanine dye was synthesized which was composed of 1-propyl-2-[7-(1-propyl-3,3-dimethyl-2-indolinydene)-1,3,5-heptatriethyl]-3,3-dimethyl-indolium and iodine ion I, perchloric acid ion $ClO_4^\oplus$ and hexafluoro-phosphate ion $PF_6^\oplus$ were arranged, respectively as anions. These various kinds of the organic dyes were subjected to a thermogravimetric analysis. The result of the analysis is shown in FIG. 13, wherein a change of weight of the dyes using I is shown by a dotted line, change of weight of dyes using $ClO_4^\oplus$ is shown by a dot-dash-line and a change of weight of the dyes using $PF_6^-$ is shown by a solid line, respectively.

Note that a differential scanning caloriemeter Model TAS-100 of Rigaku Denki Co., Ltd. was used an measuring instrument, and samples were heated in nitrogen gas of a low rate of 100 ml/min. with a temperature increase rate of 20° C./min. and temperatures at which the weight of the samples began to decrease were measured.

Figure 3:
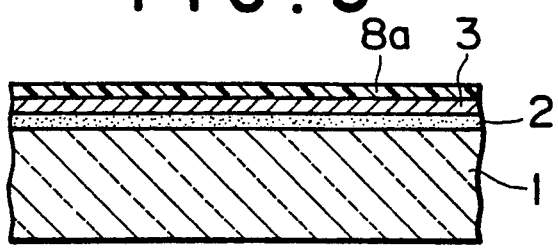
FIG. 3 is an enlarged sectional view showing a primary part of an optical disc in accordance with a second embodiment of the invention.
Figure 4:
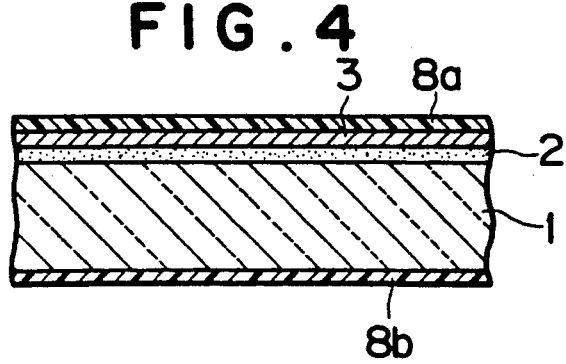
FIG. 4 is an enlarged sectional view showing a primary part of an optical disc in accordance with a third embodiment of the invention.

FIGS. 3 and 4 are enlarged cross-sectional views showing primary parts of the second and third embodiments In the case of the second embodiment shown in FIG. 3, the protective layer 8a is formed on the recording layer 3, and in the case of the third embodiment shown in FIG. 4, the protective layer 8b is also formed on the top surface side of the disc substrate 1.

The protective layer 8a may be composed, for example, of water-soluble polymers such as polyvinyl alcohol, polyethylene oxide, polyacrylic acid, polystyrene-sodium-sulfonic acid, polyvinyl pyrolydone, polymethacrylic acid, polypropylene glycol, methyl cellulose, polyvinyl nitrate or synthetic resin such as UV ray curing resin, acrylic resin, polycarbonate, epoxy resin and the like.

Since the recording layer is soluble with respect to the organic solution, in particular, if the above-described soluble polymer or the dispersion of the above-described synthetic resin is used as a protective layer, there is no adverse effect to the recording layer.

For example, ultraviolet ray curing resin, acrylic resin, epoxy resin and the like may be used as the protective layer 8b. Subsequently, the conditions or the like for forming the recording layer by the spinner method will now be described.

FIG. 16A is a schematic cross-sectional view showing a spinner coating apparatus. The apparatus comprises a motor 9, a coating nozzle 10, a turntable 11 on which the disc substrate 1 is placed and fixed, a spinner body 12, a dye solution 13, a pressurizing pump 14, and a housing 15 through which the nozzle 10 penetrates.

The environment of the turntable 11 is thus hermetically sealed from the outside by the housing 15 so that the interior is held hermetically.

In the atmospheric hermetic chamber or housing 15 of the spinner coating apparatus, for example, a permeation, such as a gas leakage, in the contact portion between the coating nozzle 10 and an outer wall of the housing 15 is allowable. If a distance d between the coated substrate 1 and the top ceiling of the housing 15 of the spinner coating apparatus shown in FIGS. 16a and 16b is in the range of $d \leq 1.5D$ where D is the diameter of the disc substrate 1, it is possible to obtain the coated substrate where the outer surface of the spin liquid layer coating on the substrate is smooth and flat and a thickness of the liquid layer coating and the thickness of the layer after drying are uniform in any position of the inner, intermediate and outer circumferential portions. Also, in the case where $d > 1.5D$ as shown in FIG. 16C, a gas flow controlling plate 24 for suppressing a gas flow from the central portion above the substrate 1 to the lower portion and a gas flow from the inner portion to the outer portion of the substrate 1 along the top surface of the substrate is located at a position above the substrate 1 to meet the relationship $d_2 \leq 1.5D$, to thereby obtain the coating layer substantially equal to that obtained in FIGS. 16A and 16D.

Figure 16D:
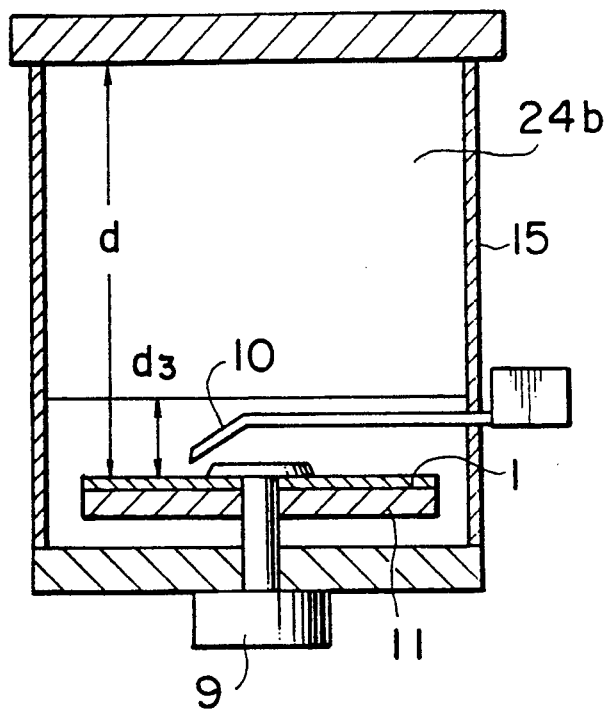

In the case where the outer diameter D of the substrate 1 which is subjected to the spinner coating on the turntable 11 is small, the distance d of the housing 15, shown in FIG. 16D, is adjusted by an upper lid 24d so as to meet the relationship, $d_3 \leq 1.5D$, to thereby obtain the desirable substrate coating layer substantially equal to that obtained in FIGS. 16A and 16B.

A rotational speed of the substrate 1 is set in a range of from 350 to 6,500 rpm in order to centrifugally remove an excess of dye or dye compound and solution away from the substrate 1. Below 350 rpm, the centrifugal force would be insufficient so that there would be a difference in drying rate between the inner and outer peripheral portions of the recording layer, resulting in non-uniformity in the thickness of the layer. Inversely, above 6,500 rpm, the film thickness would be excessively thin so that it would be impossible to obtain the desired film thickness.

Further, it would be impossible to keep the space around the turntable 11 under the completely sealed condition since the turntable 11 should be rotated for dropping the dye and dye compound. However, it is necessary to keep the space substantially under the complete sealing condition. This makes it possible to suppress the convection G that would be caused by the rotation of the turntable 11. This convection G is shown by a dotted line in FIG. 16A. The convection condition is largely effected by the distance between the substrate 1 and the top ceiling 16 kept under the sealing condition. Thus, the distance d should be equal to or less than 1.5 times of the diameter D.

Figure 17:
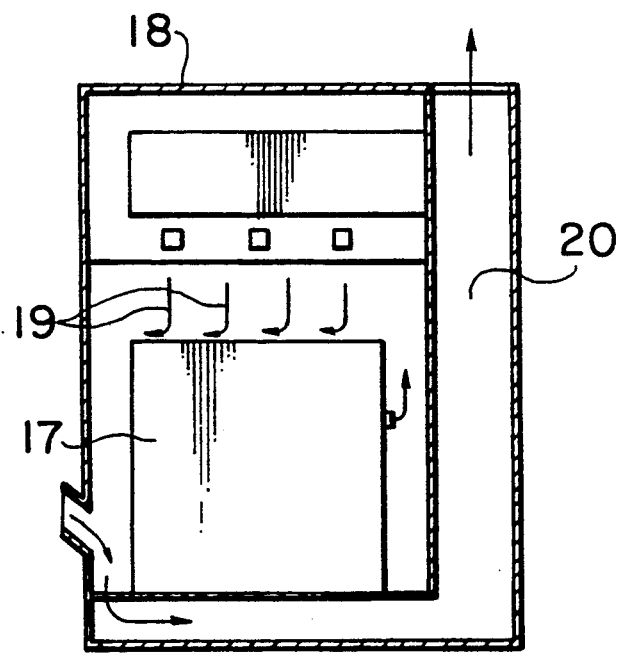
FIG. 17 is a schematic view showing a draft for encasing the spinner coating apparatus.

The spinner coating apparatus 17 is incorporated into a draft 18 as shown in FIG. 17, and then the above-described spinner coating is carried out. As shown in FIG. 17, in the draft 18, clean air 19 is always supplied from above the spinner coating apparatus 17 and is flowed downwardly while entraining organic solution vapor or the like discharged from the coating apparatus 17 through a discharge sleeve 20.

The concentration of the dye or dye compound is in the range of 0.4 to 5.0 wt %. If the concentration would exceed 5.0 wt %, the film thickness of the dye would be too thick, so that it would be difficult to obtain a responsibility in recording, to perform perforation in heat mode and to well control a change of spectrum in photo mode.

Also, if the concentration would be less than 0.4 wt %, there would be defects such as pin holes.

As described above, by keeping the substrate under the sealed condition or substantially under the sealed condition, it is possible to increase a partial pressure of the solution in the gas phase, and to improve wettability of the solution relative to the substrate 1. Thus, the uniformity in thickness of the film may be considerably improved. The difference in the optical characteristics (reflection factor and transparency) a radial direction between the present invention (sealed condition) and the prior art is shown in FIG. 14.

Figure 14:
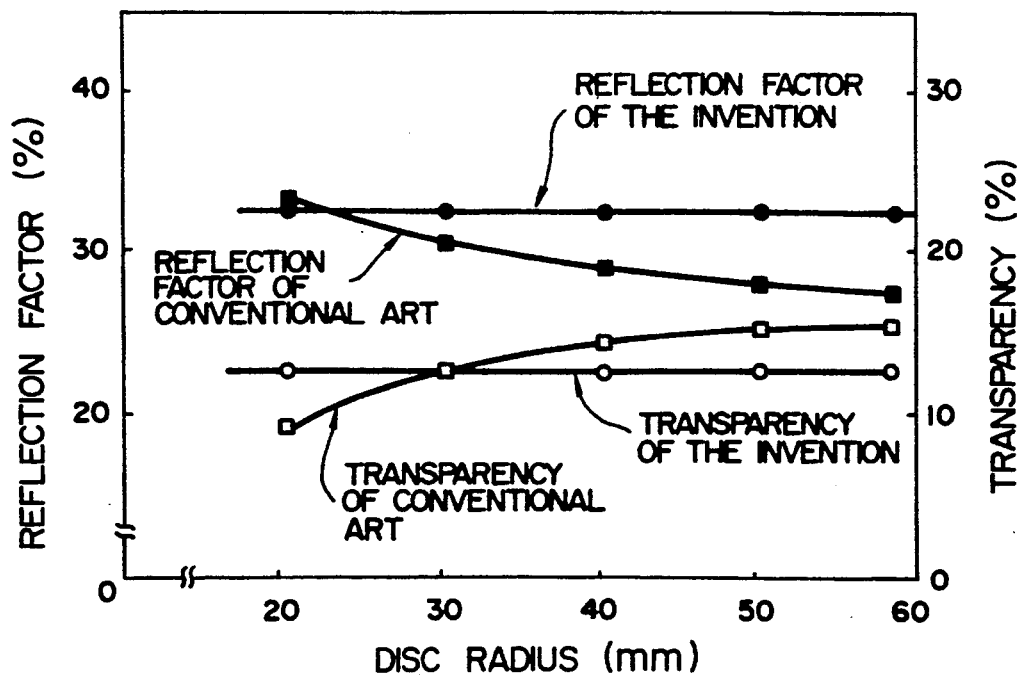
FIG. 14 is a graph showing characteristics such as reflection factor and transparency.

As is apparent from FIG. 14, it will be understood that the difference in the optical characteristics in the prior art exceeds +10% relative to the average values, but it is possible to keep the difference within +5% relative to the average values according to the present invention. This is advantageous in performing the uniform recording and readout characteristics.

The rotation time period of the substrate after the dropping of the solution of the dye or dye compound, that is, the spin coating time, should be equal to or more than 10 seconds. If the spin coating time is shorter than 10 seconds, it would be impossible to sufficiently diffuse the dye or dye compound onto the signal pattern forming surface.

Also, as desired, it is possible to set a plurality of rotational speeds for the spin coating. A rotational speed is needed for forming a uniform film and another different rotational speed is needed for drying the film after substantial completion of the formation of the film. Thus, a first stage low rotational speed and a second stage high speed rotational speed thereafter are used.

The drying condition after the spin coating is determined so that the drying temperature is in the range of 10° to 115° C. and the drying time is equal to or more than 30 seconds.

If the product of the drying temperature and the drying time would be too small in comparison with the above-described values, the drying would be insufficient. Inversely, if the product would be too large, there would be fear that undesirable thermal deformation would be generated in the substrate.

Also, in the step for dropping the solution of the dye or dye compound, it is possible to select a suitable rotational mode of the substrate as desired. For example, it is possible to select such a mode that, after the solution of the dye or dye compound is coated onto a stationary substrate substantially in a uniform manner, the substrate is rapidly rotated up to the maximum rotational speed, or such a mode that the solution of dye or compound is dropped from a clamping area to the outer peripheral portion of the substrate. Also, any other suitable mode may be used.

It is also possible to apply a thin film layer made of water-soluble polymer on the dye recording layer if necessary.

Any type of known hydrophilic polymer may be suitable for the above-described material. However, the example for the water-soluble materials are as follows.
1. polyvinyl alcohol
2. polyethylene oxide
3. polyacrylic acid
4. polystyrene-sodium-sulfonic acid 5. polyvinyl pyrolydone
6. polymethacrylic acid
7. polypropylene glycol
8. methyl cellulose
9. polyvinyl nitrate The thin layer is formed by the spin coating method.
The condition of the spin coating is as follows.

The concentration of the water-soluble polymer is adjusted in the range of 0.5 to 5.0 wt %. If the concentration would exceed 5.0 wt %, the film thickness would be too thick. Inversely, if the concentration would be lower than 0.5 wt %, defects such as pin holes would likely be generated.

The maximum rotational speed of the substrate, that is, the rpm of the substrate for centrifugally removing an excess of water-soluble polymer is adjusted in the range of 300 to 5,000 rpm. If the rotational speed would be lower than 300 rpm, there would be a difference in drying speed between the inner and outer peripheral portion of the thin film, resulting in non-uniformity of the film thickness. Inversely, if the rpm would be more than 5,000 rpm, the film thickness would be too thin, so that it would be impossible to obtain a desired film thickness.

Figure 15:
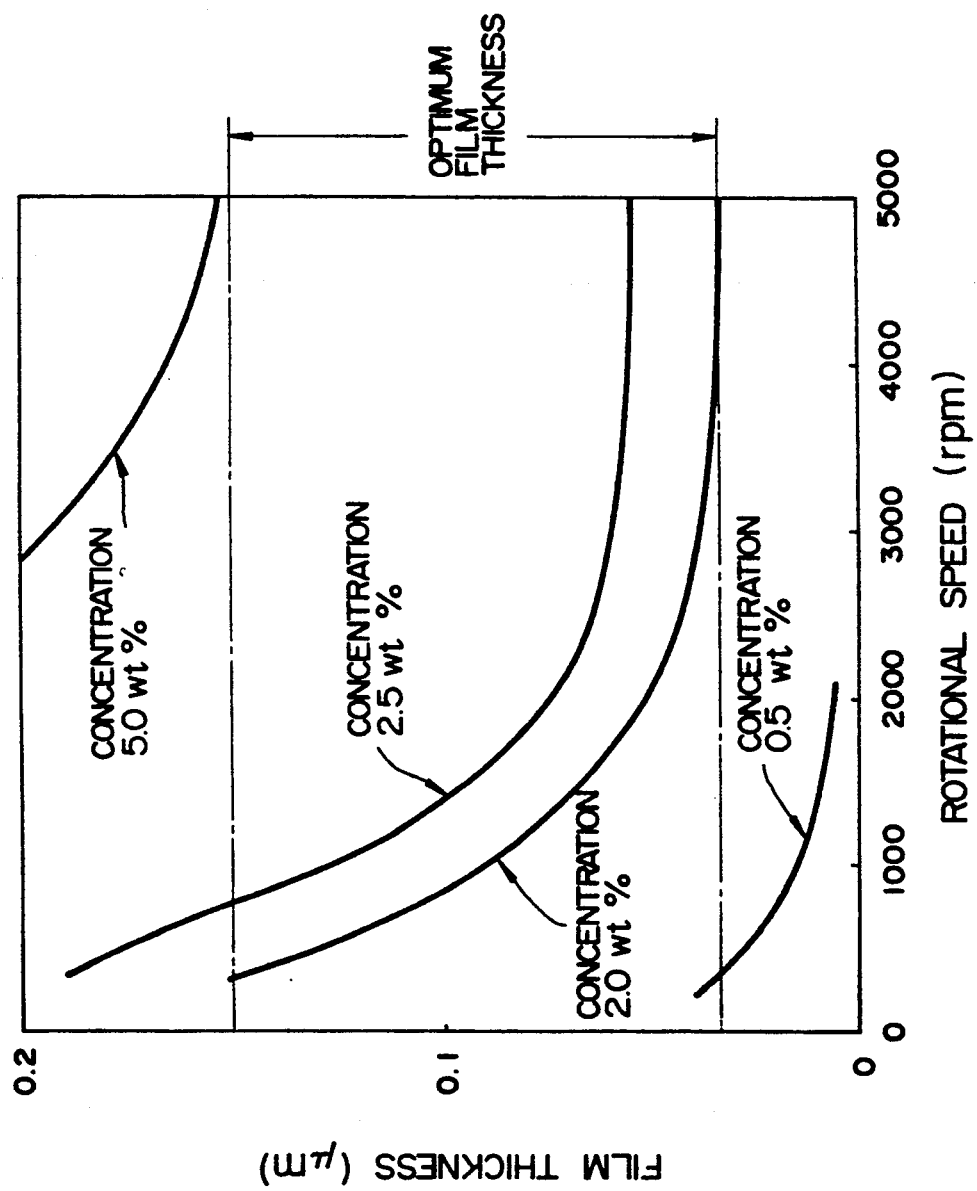
FIG. 15 is a graph showing a relationship between the rotational speed and the film thickness at respective organic dye concentrations.

The relationship between the concentration of the water-soluble polymer, a rotational speed of the substrate and thickness of a thin layer formed on the substrate will be explained with reference to FIG. 15. As shown in FIG. 15, the higher the rotational speed and the lower the concentration of the water-soluble polymer, the thinner the thickness of the layer will become.

However, in the case where the concentration is kept constant, if the rotational speed exceeds a predetermined value, the thickness of the layer is saturated.

As is apparent from FIG. 15, it will be understood that, if the concentration of the water-soluble polymer is adjusted in the range of 0.5 to 5.0 wt %, and the rotational speed of the substrate is adjusted in the range of 300 to 5,000 rpm, a desired layer thickness may be obtained.

The rotation time of the substrate after the dropping of the water-soluble polymer, that is, the spin coating time should be more than 10 seconds.

The spin coating condition is determined so that the drying temperature is in the range of 10° to 115° C. and the drying time is more than about one minute. If the product of the drying temperature and the drying time is too small in comparison with the above-described values, the drying of the thin film would be insufficient. Inversely, if the product would be too large, there would be defects such as a thermal deformation of the substrate.

The rotational mode of the substrate for spin coating the thin film is adjusted as desired in relation with the step of dropping the solution polymer. For example, after the water-soluble polymer is applied substantially uniformly over the stationary substrate, the substrate is accelerated at once up to the maximum rotational speed to centrifugally remove the excess of the water-soluble polymer. Also, the substrate is rotated at a low speed to apply the water-soluble polymer substantially uniformly. Thereafter, the substrate is accelerated up to the maximum rotational speed to thereby centrifugally remove the excess of the water-soluble polymer.

Also, after the drying step, for example, it is possible to effect a cross-linking reaction of the water-soluble polymer to improve the moisture-proof property or moisture permeation property of a non-soluble film.

More specifically, a cross-linking reaction by light irradiation, and a cross-linking reaction by heat may be used. The light irradiation cross-linking reaction is most preferred since the cross-linking reaction would not adversely affect the thermal deformation of the substrate and is superior in workability.

For example, in case of polyvinyl alcohol, the cross-linking means are as follows.

Figure 18:
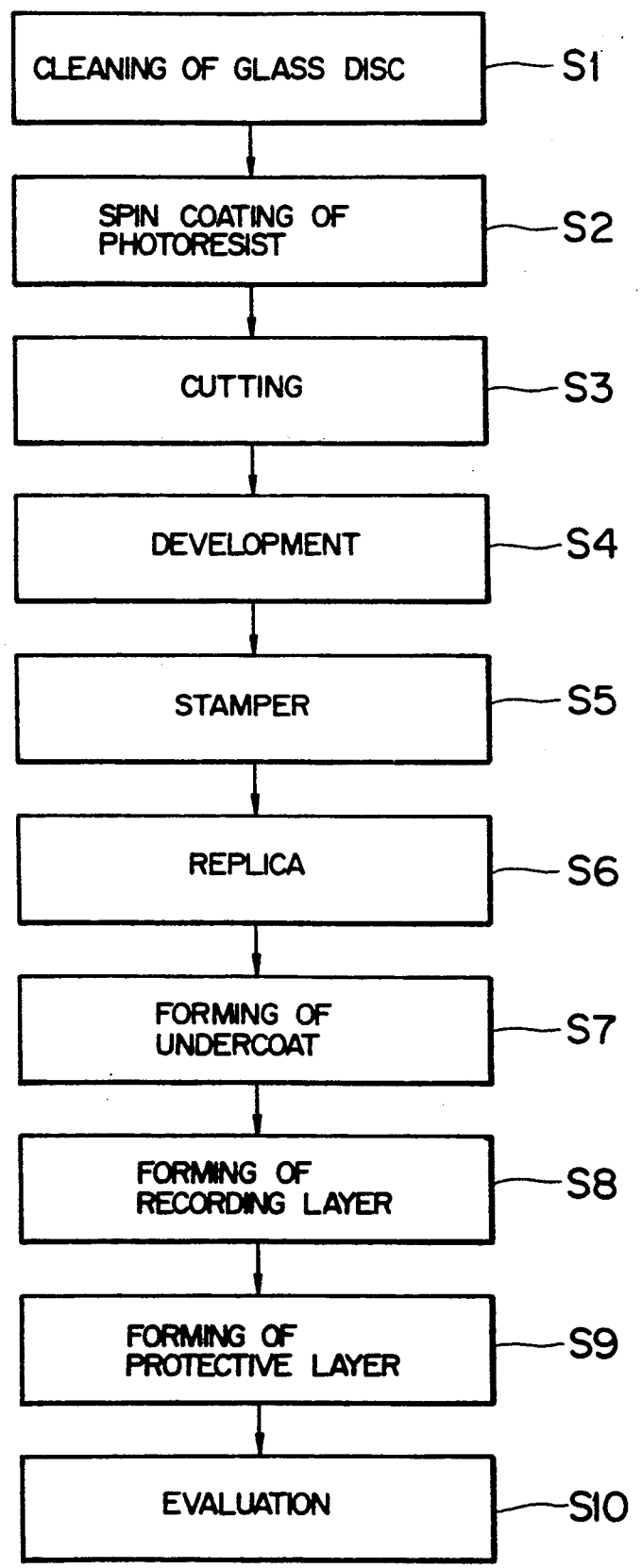
FIG. 18 is a flowchart showing the manufacturing order of the optical disc.

1. additives for inorganic cross-linking agents: copper, boron, aluminum, titanium, zirconium, tin, vanadium, chrome and the like
2. acetal formation with aldehydes
3. aldehyde formation of hydroxyl group
4. addition of activated vinyl compound
5. etherification with epoxide compound
6. reaction of dicarboxylic acid with acid catalyst
7. addition of succinic acid and sulfuric acid
8. addition of triethylene glycol and methyl acrylate acid
9. blending of polyacrylic acid and methyl vinyl ether-maleic acid copolymer FIG. 18 is a flowchart for illustrating a manufacturing process of an optical disc in accordance with the embodiment of the invention. The manufacturing order of the optical disc will be explained with reference to FIG. 18.

S1: grinding and cleaning the glass disc.

S2: spin coating photoresist on the glass disc, and forming a resist layer having a predetermined film thickness.

S3: irradiating a laser beam onto the resist layer through a condenser lens (cutting).

S4: developing the glass disc that has been disposed.

S5: forming a metal layer on a corrugated surface of the glass disc by electrical casting and obtaining a stamper by removing it.

S6: spin coating a replica agent on the surface of the stamper to form a replica layer having a predetermined thickness.

S7: forming a undercoat layer on one side surface of a transparent substrate by the spin coating.

S8: forming a recording layer on an upper surface of the undercoat layer by the spin coating.

S9: forming a thin layer on an upper surface of the recording layer by the spin coating.

S10: conducting various kinds of the tests for the optical disc and estimating the optical disc.

In the series of the manufacturing steps, it is possible to use the sealed type spin coating apparatus shown in FIG. 16 also in the step S2 for forming the resist layer, the step S6 for forming a replica layer, the step S7 for forming a undercoat layer and the step S9 for forming the thin film layer. By using this apparatus, it is possible to suppress the diffusion of the solution and to suppress the generation of the gas bubbles to form a uniform resist layer, a uniform replica layer, a uniform undercoat layer and a uniform thin layer without any non-uniformity in film thickness, to thereby provide an optical disc with a high reliability.

Figure 19:
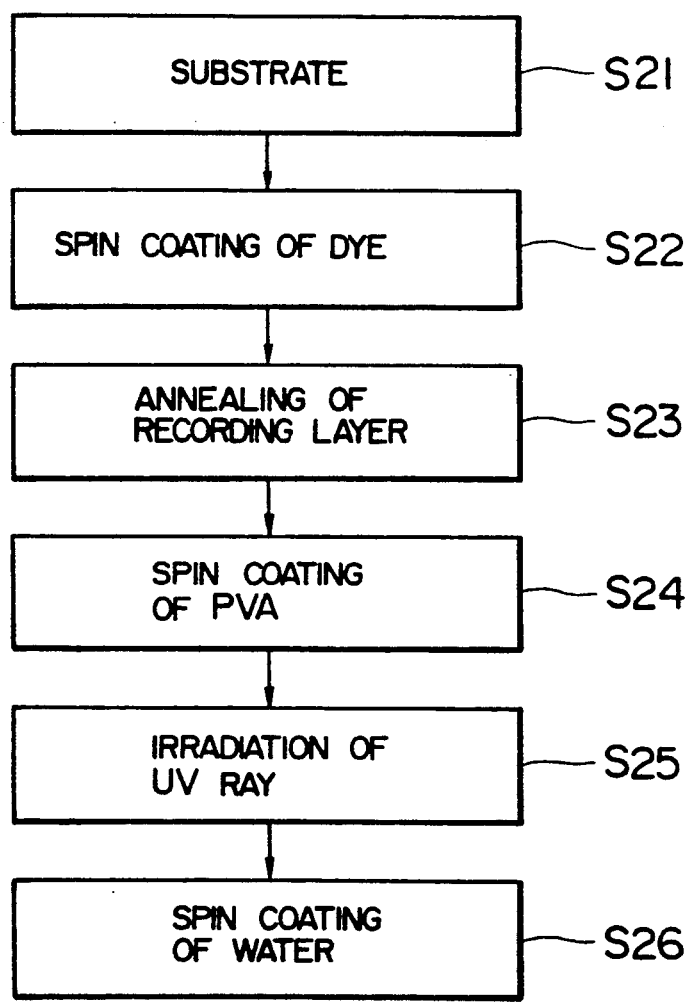
FIG. 19 is a flowchart showing the recording layer formation and the protective layer formation in greater detail.

FIG. 19 is a flowchart for showing in more detail the formation S8 and S9 of the recording layer and the protective layer in the flowchart of FIG. 18.

S21: preparing a substrate (disc) where a replica layer, an undercoat layer (that may be dispensed with) or the like has been formed.

S22: spin coating methanol into which a cyanine dye is dissolved and an infrared absorbent is dissolved as a stability, to form the recording layer.

S23: annealing the recording layer at a temperature of 60° to 80° C. for 50 to 70 seconds.

S24: spin coating the solution of polyvinyl alcohol (PVA) and ammonium bichromate (NH$_4$Cr$_2$O$_7$) onto the recording layer.

S25: cross-linking the PVA by irradiating an ultraviolet ray onto the PVA coating for 50 to 70 seconds.

S26: after cross-linking, spin coating a small amount of water onto the cross-linked PVA coating film, to wash the cross-linking agents (NH$_4$Cr$_2$O$_7$) and PVA that have not been used for the cross-linking, to thereby a thin film on the recording layer.

Preferred Embodiments

Specific examples of the recording layer materials and rotational modes of the spin coating are as follows.

EXAMPLE 1

A substrate made of polycarbonate with a diameter of 130 mm was produced by injection molding. The adjusting method for the dye solution was as follows.

The following cyanine dye was dissolved in methanol to prepare a solution having a concentration of 0.5 wt %.

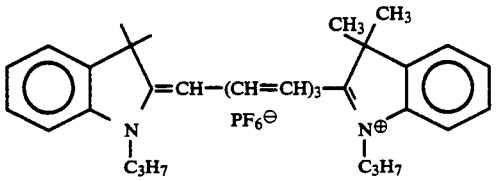

The condition of the spin coating is as follows.

While the substrate was rotated at 500 rpm, the above-adjusted solution was dropped onto the central portion of the substrate. Thereafter, the substrate was rotated for five seconds. Thereafter, the substrate was rotated at 3,000 rpm for ten seconds. The atmosphere for the turntable was defined by the distance d of 12 cm between the top ceiling 16 under the sealed condition and the substrate 1 (see FIG. 16A). The volume thereof was 5,000 cm$^3$ under the sealed condition. The drying was carried out at room temperature for one minute or more. The uniformity of the thus formed recording layer was such that the optical characteristics, reflection factor and transparency were within 0.1%.

EXAMPLE 2

The substrate that was substantially the same as that of Example 1 was prepared. The above-described cyanine dye was dissolved in 1,2-dichloroethane, to adjust the concentration of the solution to 1.2 wt %.

By using the solution of polyvinyl nitrate 2.5 wt % as material for the undercoat, the substrate was rotated at 5,500 rpm to form a film. Thereafter, ammonium bichromate was added, and UV irradiation was carried out to perform the cross-linking reaction. The film thickness was 60 nm. The above-described dye and 1,2-dichloroethane solution was dropped on the undercoat layer while rotating the substrate at 500 rpm. Thereafter, the rotational speed was changed to 3,000 rpm. The atmosphere for the turntable and the obtained characteristics are the same as those in Example 1.

Figure 20:
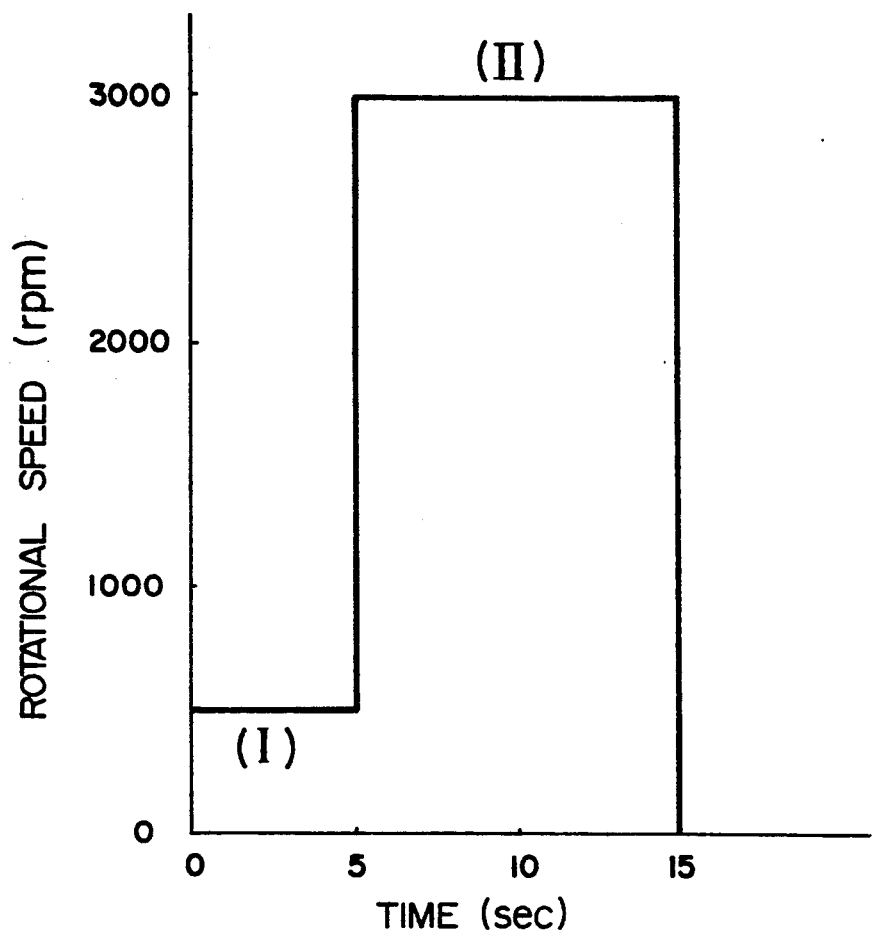
FIG. 20 is a graph showing a specific coating mode.
Figure 21:
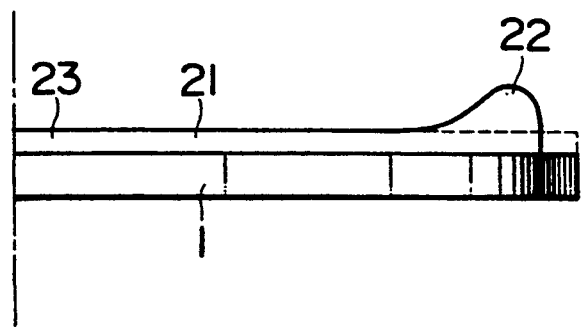
FIG. 21 is a view showing the order of the formation of the recording layer in the coating mode shown in FIG. 20.

FIG. 20 is a graph illustrating the coating mode of the foregoing Example 1 (where the recording layer is made from cyanine dye and methanol). FIG. 21 is a view illustrating the order of formation of the recording layer in the coating mode.

As described in conjunction with Example 1, the dye solution is dropped in the inner circumferential portion of the substrate 1 while rotating the substrate 1 at 500 rpm, so that the solution is spread toward the outer peripheral portion by the action of the centrifugal force to form a uniform liquid film 21 (see FIG. 21). This rotation is continued for five seconds. Although, in this first stage I, the thickness of the film of the recording layer 3 is substantially determined, this condition is substantially in a non-dried state so that, if the finger touches the liquid film 21, the liquid will attached to the finger.

In the final step of the first stage I, as shown in FIG. 21, a raised portion of the liquid is formed in the outer circumferential portion of the liquid film 21, and at the same time, the inner circumferential portion 23 becomes more viscous than ever. Under this condition, the rotational speed is increased up to 3,000 rpm for a period of 0.1 second. The rapid change in rotational speed causes the raised portion 22 to be removed and flattened as shown by a dotted line. Even if the rotational speed is thus rapidly changed, the inner circumferential portion 23 becomes highly viscous as described above. Therefore, there is no fear that the thickness of the inner circumferential portion 23 would be changed by the centrifugal force. In this second state II, the drying is mainly carried out. Although the organic solution in the liquid film 21 will volatilize, there is no change in thickness of the film. After the substrate is rotated at 3,000 rpm for ten seconds, the rotation of the substrate 1 is abruptly stopped.

Thus, according to the spinner coating method, the solution is spread over the substrate to form a liquid film (first stage I), and thereafter, the liquid film is dried (second stage II) to form the desired recording layer. However, in the series of steps, in particular, in the first stage I, the adverse effect of convection formed above the substrate 1 (see Fig. 16a) would be remarkable. This convection G flows toward the central portion of the substrate 1 due to the rotation of the turntable 11, and then flows along the surface of the substrate 1 toward the outer circumferential portion of the substrate 1 to form a recirculation flow. In order to dry the above-described liquid film 21 (high viscosity), the convection to some extent is needed. If the convection G is large, the thickness of the recording layer is non-uniform, which is not desired. For this reason, in the example shown in FIG. 16A, the housing 15 is used for suppressing the flow of the convection G. Other examples of the convection suppression means are shown in FIGS. 22 through 29.

Figure 22:
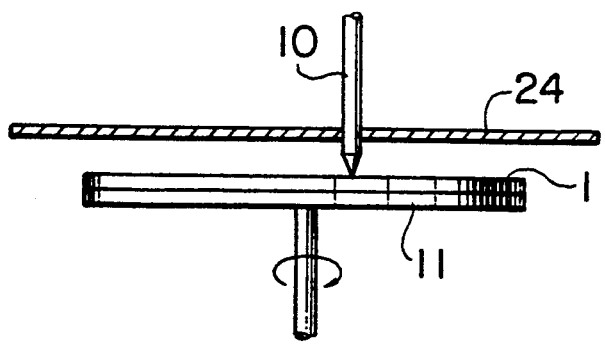
FIGS. 22 through 28 are schematic cross-sectional views showing convection suppressing means.

In an example shown in FIG. 22, a plannar convection suppressing member 24 having a wider area than that of the substrate 1 is disposed above and close to the substrate 1, and a coating nozzle 10 is extended through the suppressing member 24 to the substrate 1.

Figure 23:
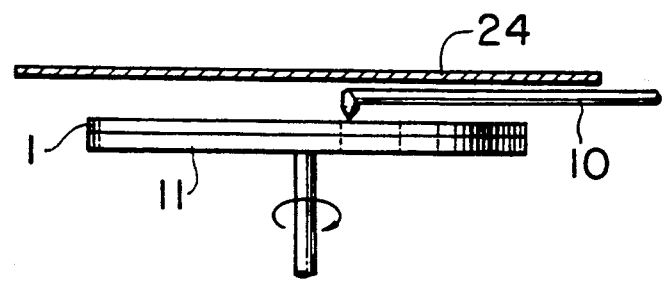

In an example shown in FIG. 23, there is a difference from the example shown in FIG. 22 in that the coating nozzle 10 does not penetrate the suppressing member 24 but is inserted between the substrate 1 and the suppressing member 24 from the lateral side. Thus, the nozzle 10 may be drawn away from this location.

Figure 24:
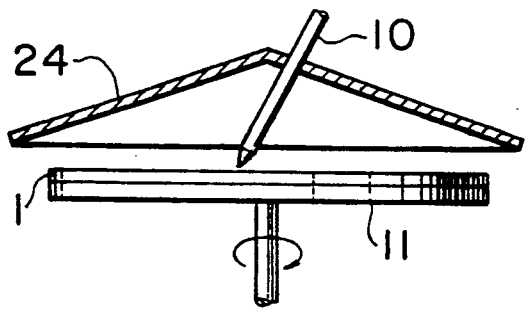

FIG. 24 shows an example where a conical shaped suppressing member 24 is used.

Figure 25:
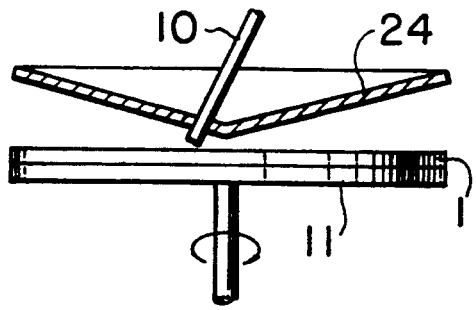

FIG. 25 shows an example where a suppressing member 24 having a V-shaped cross section is used.

Figure 26:
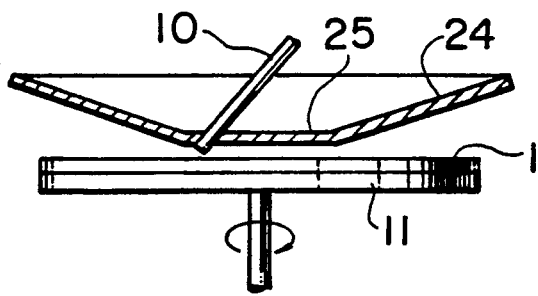

In an example shown in FIG. 26, there is a difference from that of FIG. 25 in that a flat portion 25 is formed in the central portion of the suppressing member 24.

Figure 27:
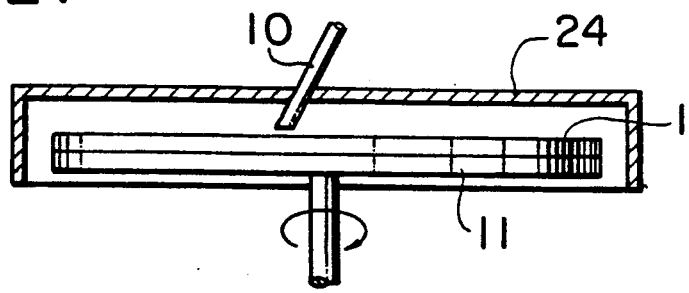

In FIG. 27, a substantially dish-like suppressing member 24 is used.

Figure 28:
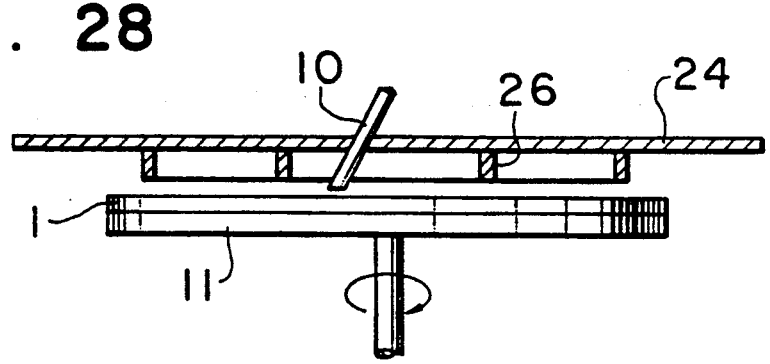
Figure 29:
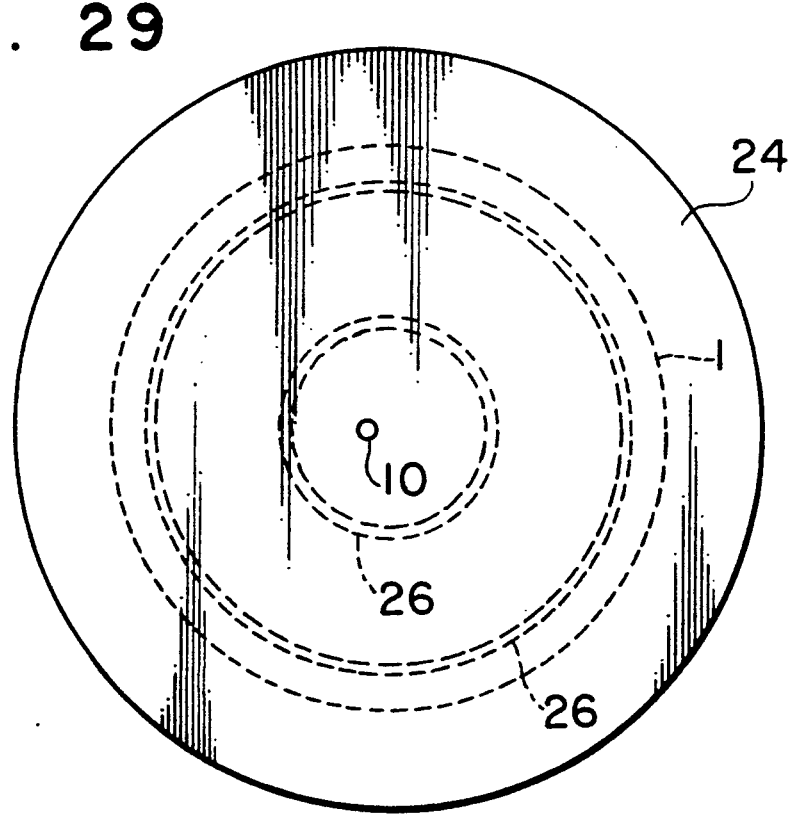
FIG. 29 is a schematic plan view showing a modification shown in FIG. 28.

In the example shown in FIG. 28, one or more projected annular walls 26 are formed concentrically on a lower surface confronted with the substrate 1 to form a suppressing member 24.

Figure 30:
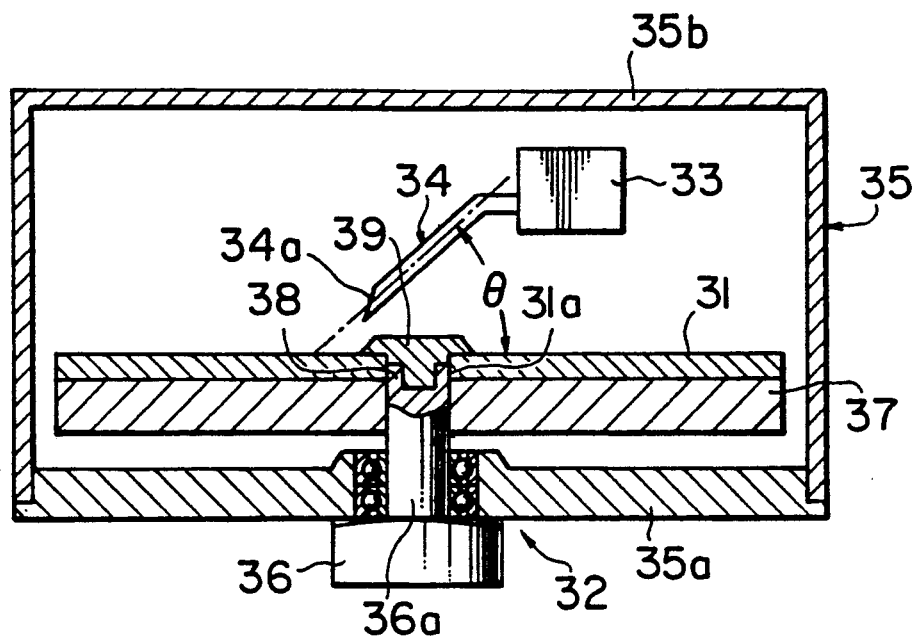
FIG. 30 is a sectional view showing a spinner coating apparatus in accordance with fourth embodiment of the invention.
Figure 31:
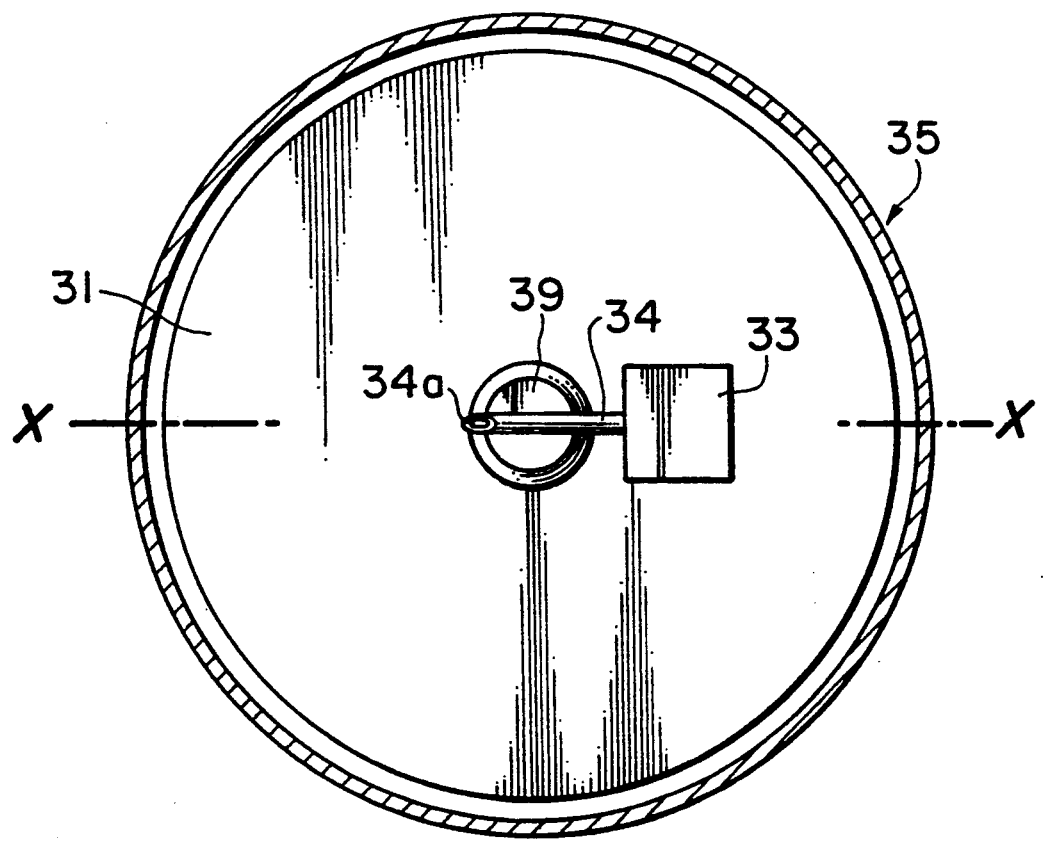
FIG. 31 is a partially fragmentary plan view showing the spinner coating apparatus shown in FIG. 30.

FIG. 30 is a cross-sectional view showing an apparatus for producing an optical data recording disc in accordance with a fourth embodiment of the invention. FIG. 31 is a plan view from which a part of the apparatus has been removed for explanation. As shown in FIGS. 30 and 31, the apparatus for producing an optical data recording disc is composed mainly of a rotary means 32 for drivingly rotating a substrate 31, a dispenser 33 for supplying a predetermined amount of film material, a nozzle 34 for injecting the film material on the substrate 31, and a sealing case 35 for encasing these devices.

The rotary means 32 is composed of a motor 36 mounted on a lower surface of a bottom plate 35a forming a lower portion of the sealing case 35, a motor shaft 36a penetrating vertically through the bottom plate 35a and held rotatably, and a turntable mounted horizontally on an end of the motor shaft 36a extending upwardly from the bottom plate 35a.

In the upper central portion of the turntable 37, there is projected a positioning projection 38 having a diameter enough to be inserted into a center hole 31 formed in the substrate 31, so that the substrate 31 may be mounted in a coaxial manner. The substrate 31 mounted on the turntable 37 is fixed thereto by a disc holder 39 fitted into the positioning projection 38.

The nozzle 34 extends from the dispenser 33 and is positioned in a confronting relation to the inner-circumferential portion of the substrate 31. As shown in FIG. 31, the end 34a of the nozzle 34 is directed in a radial direction X—X from the inner circumferential portion to the outer circumferential portion of the substrate 31. Also, as shown in FIG. 30, as viewed from the side direction of the nozzle 34, the nozzle end 34a is inclined at an angle $\theta$ less than 90 degrees relative to the substrate 31. The optimum preset angle $\theta$ of the nozzle end 34a relative to the substrate 31 is determined by the viscosity of the material, the rotational speed of the substrate 31 and the like.

Figure 32:
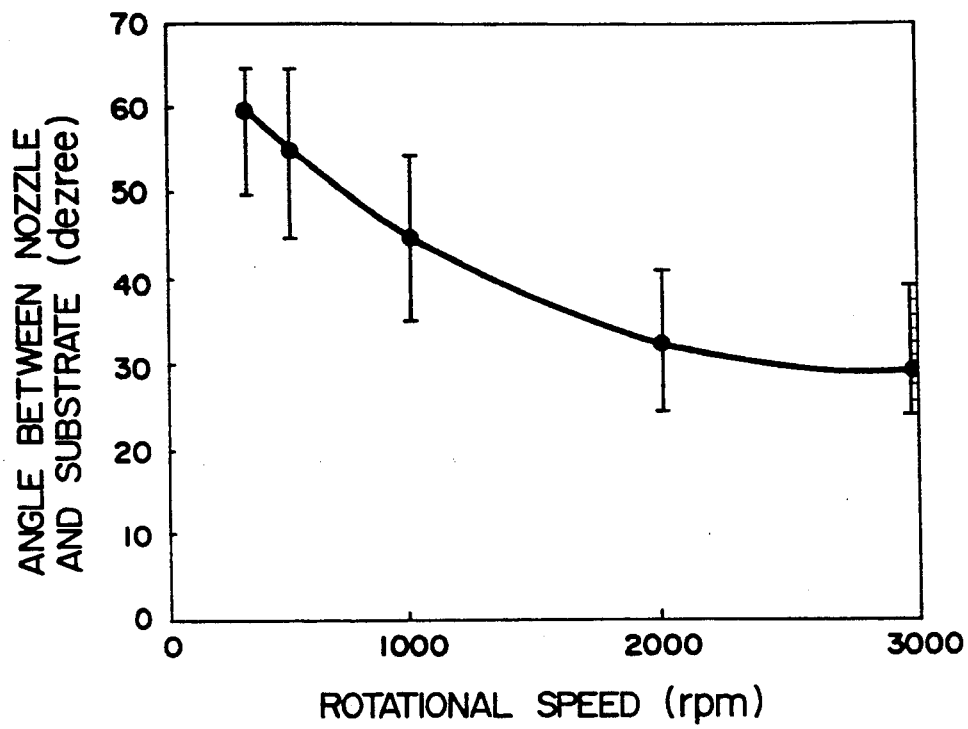
FIG. 32 is a graph showing a relationship between the angle defined by the nozzle and the substrate and the rotational speed of the substrate.

FIG. 32 is a graph showing a relationship between the preset angle $\theta$ of the nozzle end 34a relative to the substrate 31 and the rotational speed of the substrate 31, which is suitable for forming a thin film having a difference in thickness within 5%, the ordinate representing the preset angle $\theta$ of the nozzle end 34a relative to the substrate 31 and the abscissa representing the rotational speed of the substrate 31. In FIG. 32, solid lines represent ranges of change due to factors other than the rotational speed, and black points represent average values of these changes. As is apparent from the graph, the higher the rotational speed of the substrate, the smaller the preset angle $\theta$ of the nozzle end 34a relative to the substrate 31 will be set. Also, there is a change in optimum preset angle of about ±10 degrees, and this change should be suitably adjusted.

Figure 33:
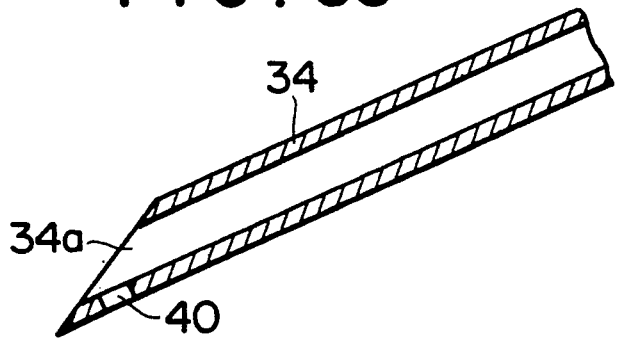
FIGS. 33 and 34 are enlarged cross-sectional views showing nozzle ends of the coating apparatus.
Figure 34:
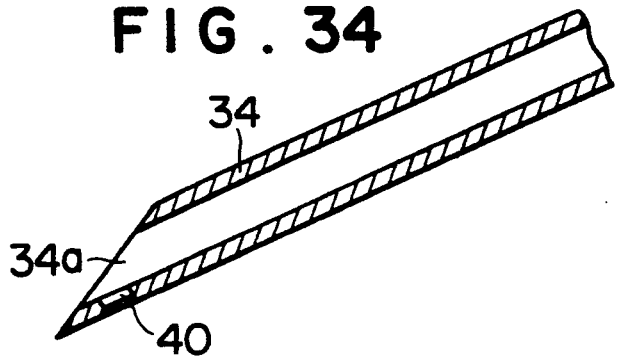

As best shown in FIGS. 33 and 34, the end 34a of the nozzle 34 is formed so that the portion of the end 34a confronting the substrate 31 is longer and the opposite portion thereof is short to form a slant shape, and a small hole 40 for preventing a liquid drop is formed in the vicinity of the end of the nozzle on the side of the substrate 31. The small hole 40 may penetrate the end portion (see FIG. 33) or may be a recess (see FIG. 34).

The sealing case 35 is composed of the above-described bottom plate 35a and a cover 35b for covering the upper portion of the dispenser 33 and the nozzle 34. The sealing case 35 is used for stably controlling the air flow within the case 35 and should be as small as possible.

In the apparatus in accordance with this embodiment, since the end 34a of the nozzle 34 is directed in the radial direction of the substrate, that is, in a direction of the centrifugal force applied to the solution of the film material, when the solution is dropped, a large amount of solution is spread in the centrifugal direction, and a relatively small amount of solution is spread opposite to the centrifugal direction. Accordingly, the flow of solution toward the outer peripheral portion of the substrate 31 is smooth to form a thin film having a high uniformity in thickness.

Also, since the dispenser 33 and the nozzle 34 are located in constant positions, it is possible to make small spaces for these members. Accordingly, it is possible to make compact the sealing case 35, which also leads to the uniformity in thickness of the thin film.

Further, since the end portion 34a of the nozzle 34 on the substrate 31 side is longer, the opposite end portion is shorter to form a slant shape, and simultaneously therewith, the small hole 40 for preventing the liquid drop is formed in the vicinity of the end portion on the substrate side, there is no fear that the liquid drop would cause faults in products after the formation of the film, and the productivity is enhanced.

In the apparatus for producing an optical data recording disc, after the substrate 31 has been rotated at a predetermined rotational speed, the dispenser 33 is driven to supply the film material from the nozzle 34.

Figure 35:
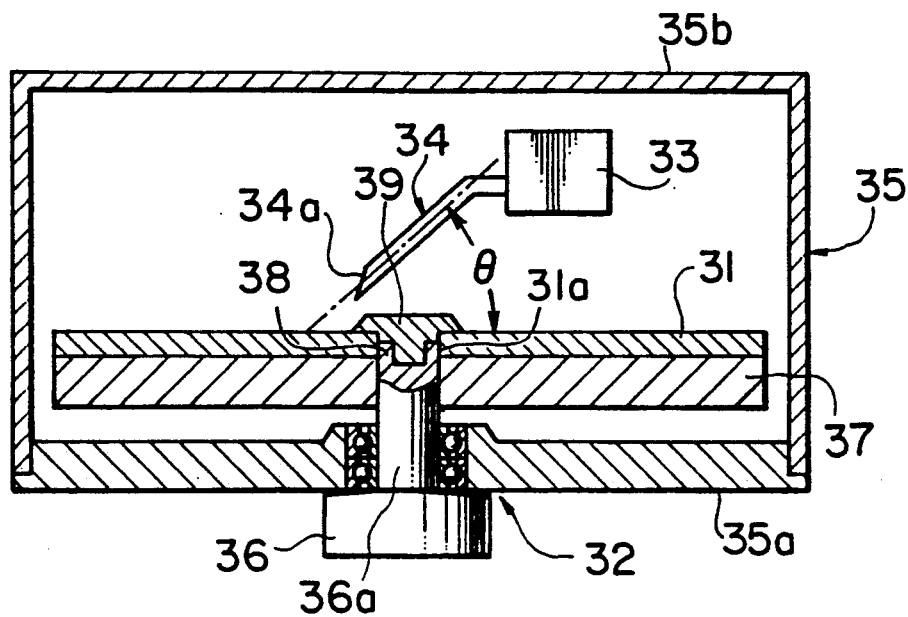
FIG. 35 is a sectional view showing a spinner coating apparatus in accordance with a fifth embodiment of the invention.
Figure 36:
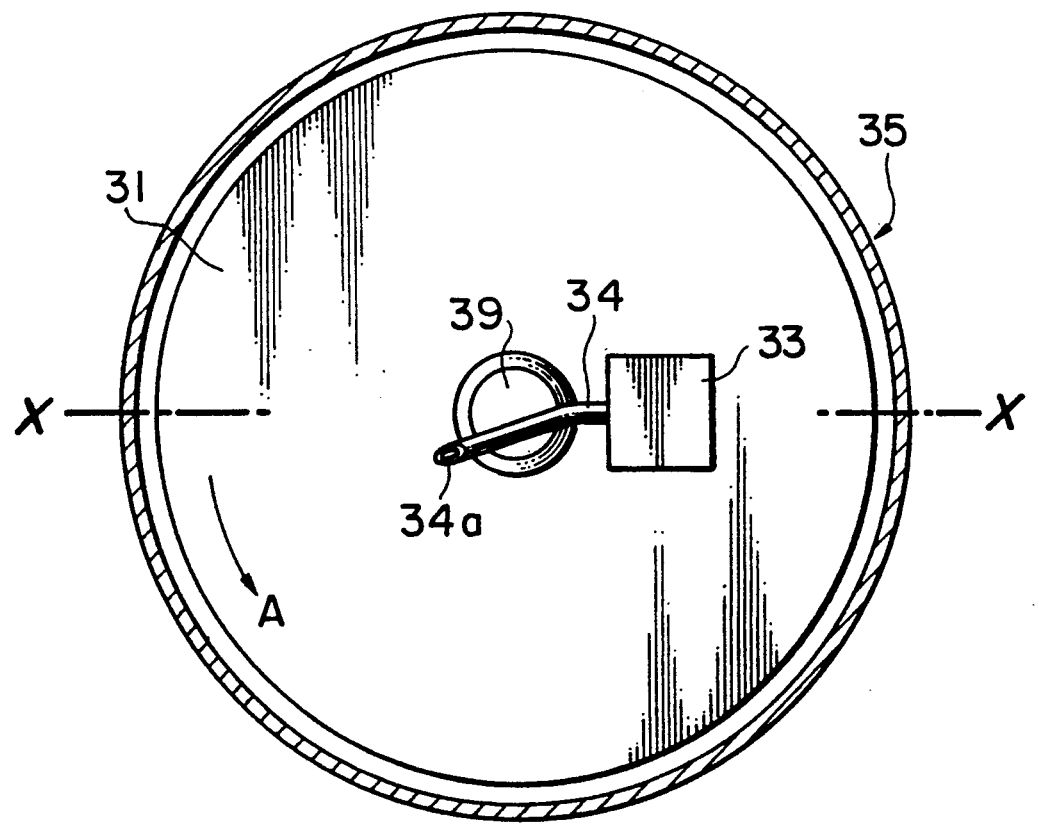
FIG. 36 is a plan view, from which a part has been removed, showing the spinner coating apparatus shown in FIG. 35.

FIGS. 35 and 36 show a fifth embodiment of the invention.

In this embodiment, as shown in FIG. 35, the end portion 34a of the nozzle 34 is inclined relative to the substrate 31 at an angle $\theta_1$ smaller than 90 degrees, and as shown in FIG. 36, the end portion 34a is also inclined in a direction of the rotation A of the substrate 31 relative to the radial direction X—X of the substrate 31 at an angle $\theta_2$ smaller than 90 degrees.

With such an arrangement, when the solution of the film material is dropped from the nozzle 34, a large amount of solution is spread in a direction in which the rotational force of the substrate and the centrifugal force is applied. As a result, the flow of the solution directed in the circumferential direction and the radial direction of the substrate 31 is smooth to form a thin film layer with more reliability.

Figure 37:
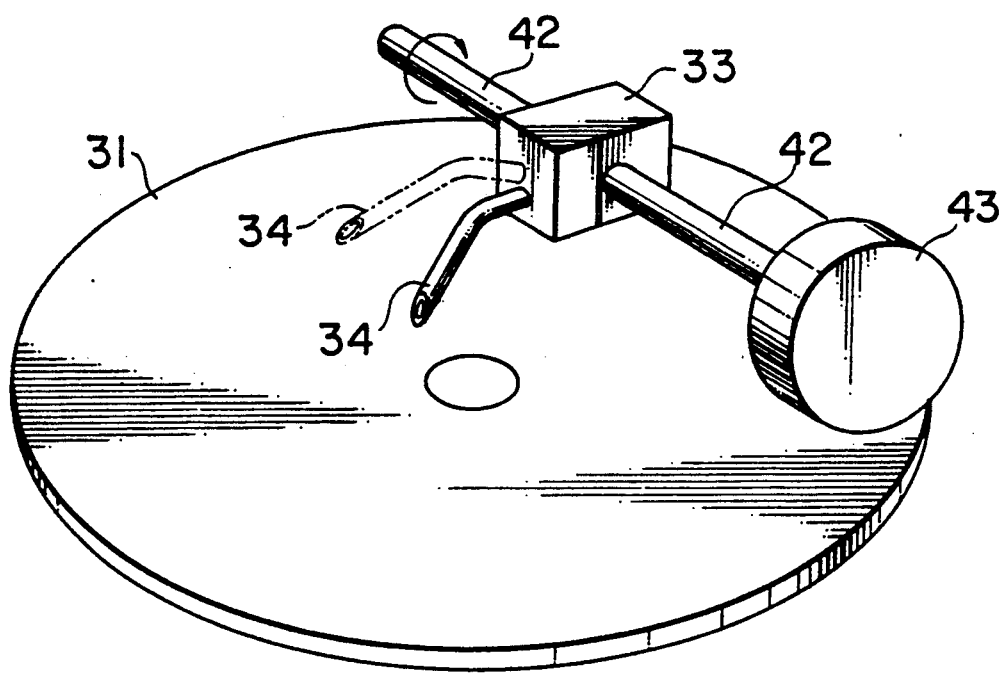
FIG. 37 is a perspective view showing a primary part of a spinner coating apparatus according to a sixth embodiment of the invention.

A sixth embodiment of the invention will now be described with reference to FIG. 37.

In the apparatus in accordance with this embodiment, the dispenser 33 is fixed to a rotaty shaft 42 mounted rotatably on a cover 35b of the sealing case 35. A drive source 43 such as a motor provided on an outer surface of the cover 35b is effected so that the end portion 34a of the nozzle 34 is suitably swung from the inner circumferential portion to the outer circumferential portion of the substrate 31.

With such an arrangement, it is possible to rapidly apply the film material over the entire surface of the substrate and to further improve the uniformity in thickness of the thin film. This embodiment is particularly suitable for the spin coating of the thin film over the optical data recording disc having a large diameter. Since the dispenser 33 and the nozzle 34 are located in constant position, the space needed for these components will not be increased. Thus, the sealing case 35 will not be increased in volume. Accordingly, degradation in thickness uniformity would be avoided.

In the apparatus for producing an optical data recording disc, after the substrate 31 has been rotated at a predetermined rotational speed, the dispenser 33 is driven to supply the film material from the nozzle 34 and simultaneously to swing the end portion 34a of the nozzle 34 from the inner circumferential portion to the outer circumferential portion of the substrate 31 by driving the drive source 43.

The specific examples related to the apparatus according to the invention and method for producing an optical data recording disc using this apparatus will be explained to refer to the advantages of the invention.

In the apparatus according to this embodiment, the nozzle having an inner diameter of 1 mm and cut at 60 degrees at the end portion thereof was directed in the radial direction of the substrate, and the end portion of the nozzle is arranged to be inclined at an angle of 45 degrees relative to the substrate. Also, the substrate made of polycarbonate with a diameter of 120 mm was mounted on the turntable, and a sealing case having a volume of 5000 cm$^3$ was provided therefor.

During the formation of the recording layer, after the substrate had been rotated at 500 rpm, 0.5 wt % methanol solution of cyanine dye represented by the following formula was injected at a pressure of 0.5 kg/cm$^2$ onto a position defined by a radius of 27 mm from the center of the substrate from the nozzle.

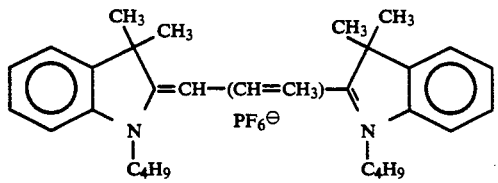

The viscosity of the methanol solution is 0.006 kg/sm. As the cyanine dye solution, it is possible to use, in addition to methanol, methyl-ethyl ketone (voscosity: 0.00441 kg/sm), 1,2-dichloroethane (viscosity: 0.008 kg/sm), nitrobenzene (viscosity: 0.0201 kg/sm) and the like.

Figure 38:
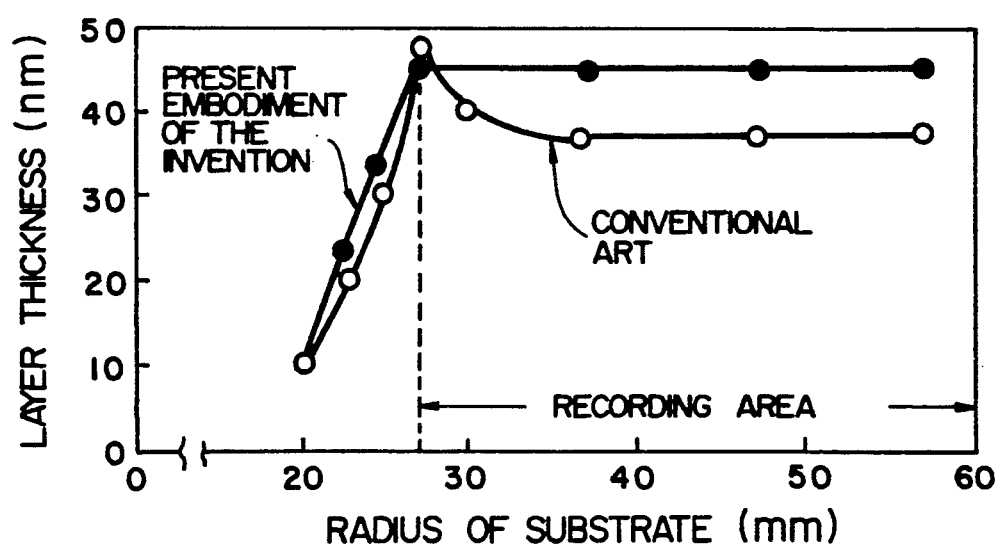
FIG. 38 is a graph showing characteristics of the film thickness between the embodiment of the invention and the prior art.

In the heat mode recording layer of the cyanine dye type formed by the foregoing apparatus and method, as shown by black points in FIG. 38, there is no change in thickness with respect to the recording area (defined by a radius of 27 mm or more from the center of the substrate).

Figure 47:
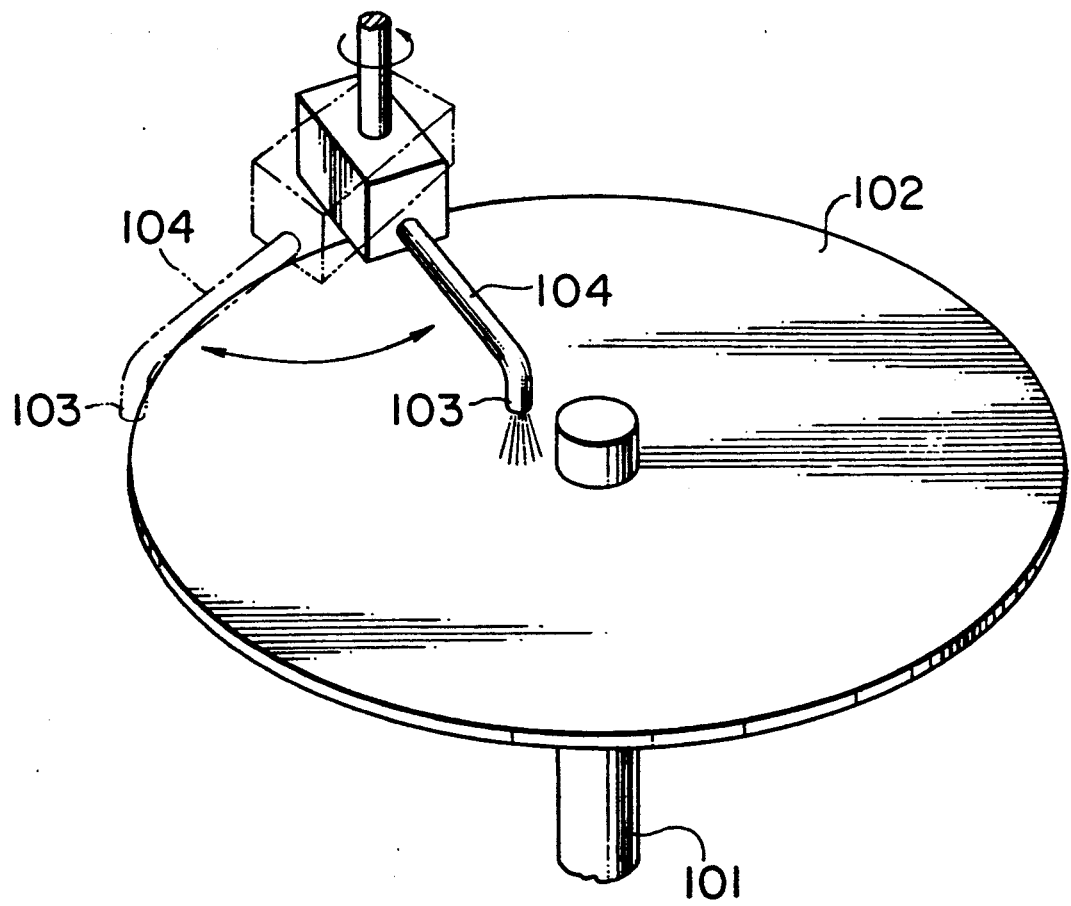
FIG. 47 is a perspective view showing a conventional spinner coating apparatus.
Figure 53:
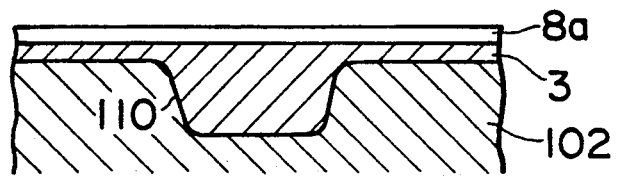
FIGS. 53, 54, 55 and 56 show the cross-sections of the coatings.
Figure 54:
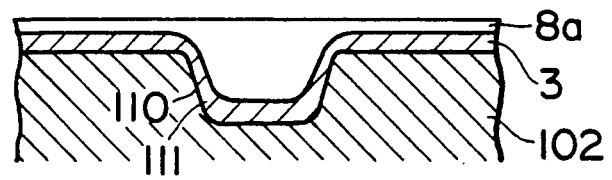
Figure 55:
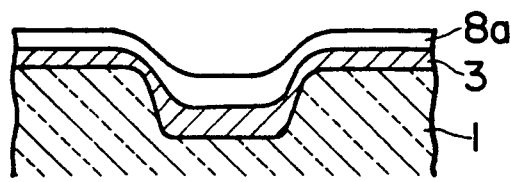
Figure 56:
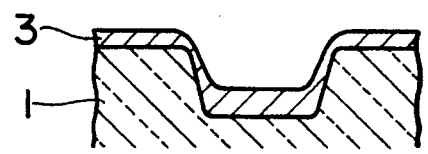
Figure 57A:
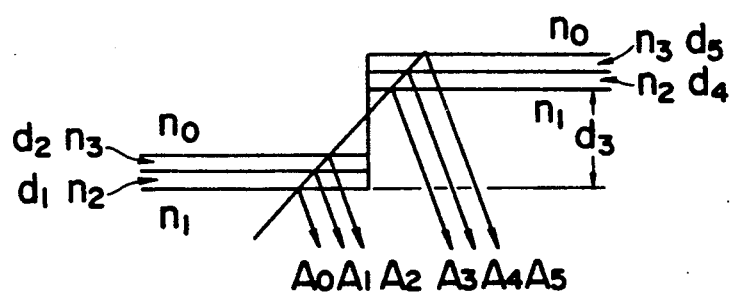
FIGS. 57A, 57B and 57C are a schematic diagram and graphs respectively showing the optical characteristics of light for explaining the spin coating method of the invention.
Figure 57B:
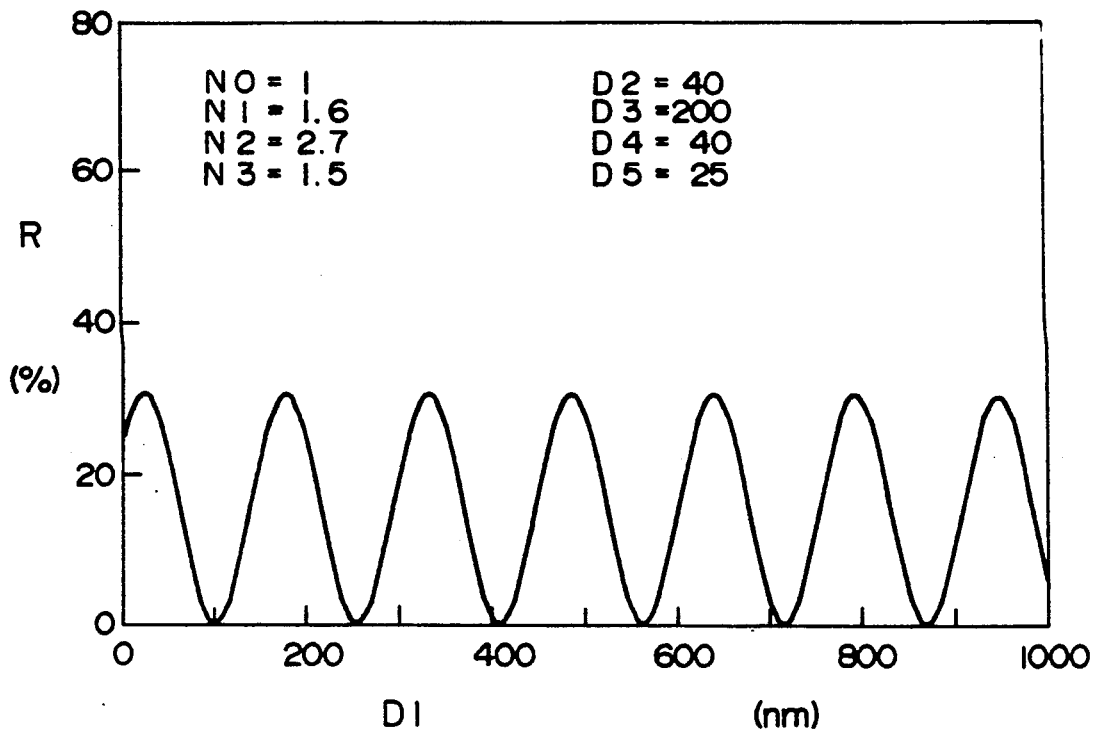
Figure 57C:
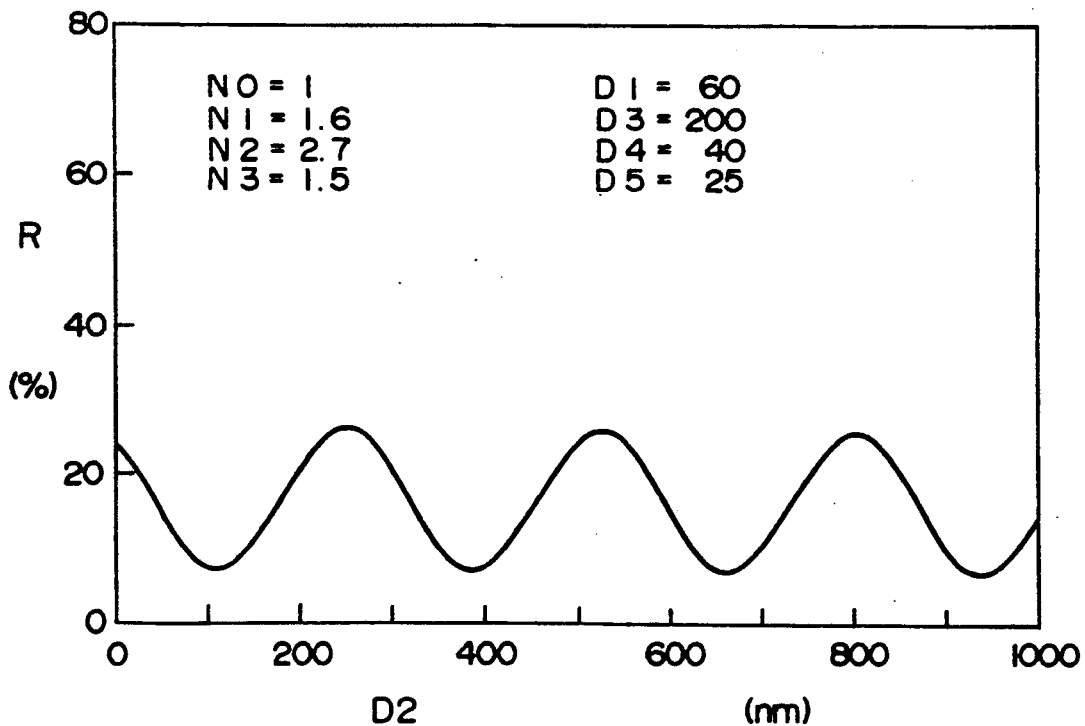

The thickness distribution of the recording layer formed by the conventional spin coating apparatus shown in FIG. 47 is shown by white points in FIG. 38 as comparisons. The various conditions other than the condition of the spin coating apparatus were the same as those in the foregoing embodiment.

As shown in the graph of FIG. 38, according to the conventional spin coating apparatus, the film thickness is at maximum in the innermost portion, and the film thickness from the intermediate area to the outer peripheral area is kept substantially constant. There is a difference by 8 nm in film thickness between the thickest portion and the thinnest portion.

According to the apparatus of the invention, it will be understood that the recording layer having a uniform thickness may be formed on the substrate.

Incidentally, in the foregoing embodiment, the explanation has been made as to the case where the recording layer is formed on the substrate. However, it is possible to apply the invention to any film spin coating case, such as a case of forming an undercoat layer and for the recording layer, a case of forming a thin layer on a surface of the substrate.

It is apparent that a shape or size and diameter of the nozzle, a shape and rotational speed of the turntable, kind of film material, and injection pressure are not limited to those shown in the foregoing embodiments but may be modified as desired.

Figure 39:
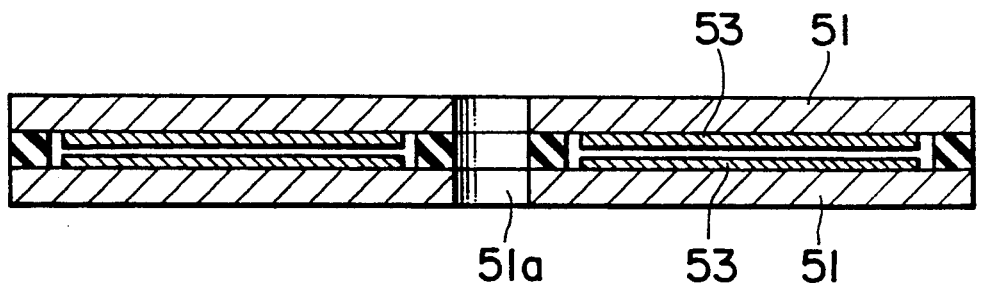
FIG. 39 is a cross-sectional view showing an air sandwich type optical disc in accordance with a seventh embodiment of the invention.
Figure 40:
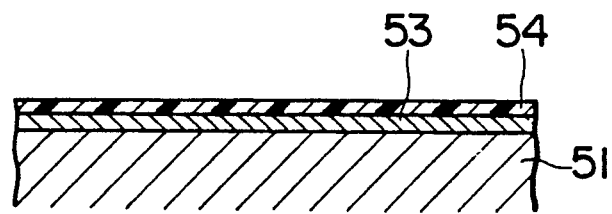
FIG. 40 is an enlarged sectional view showing a primary part of the optical disc shown in FIG. 39.

FIG. 39 is a cross-sectional view showing an air sandwich type optical disc in accordance with a seventh embodiment of the invention, and FIG. 40 is an enlarged cross-sectional view of a primary part of the optical disc.

In FIGS. 39 and 40, reference numeral 51 denotes a disc-like substrate made of transparent material that may be polycarbonate, polymethylmethacrylate, polymethylpenten, epoxy resin or the like or of transparent ceramics, such as glass. In this embodiment, a polycarbonate substrate is used. Reference character 51a denotes a center hole of the substrate. Signal patterns 52 such as guide tracks corresponding to tracking signals and prepits corresponding to address signals are formed on one-side surface of the substrate 51 (see FIG. 41).

A suitable method is applied in the formation of the signal pattern 52 in accordance with a kind of material of the substrate. For example, if the substrate 51 is formed of thermoplastic resin such as polycarbonate, polymethylmethacrylate, polymethylpenten or the like, a so-called injection method is used in which molten substrate material is injected into an injection molding die to integrally form the substrate 51 and the signal pattern 52 is applied thereto. A so-called compression method or so-called compression method in which, after the molten substrate material has been injected into the injection molding die, the pressure is applied to the substrate material may be applied as the formation means. Furthermore, in the case where the substrate 51 is formed of a thermosetting resin such as epoxy resin, a photopolymerization resin is expanded between the substrate 51 and a stamper (molding die) in which a reversed pattern of a desired signal pattern is formed, so that the reversed pattern of the stamper is transferred to the substrate 51 (so-called 2P method, i.e., photopolymerization) in a preferred mode. Incidentally, when a so-called pouring method for statically pouring the molten substrate material into the molding die to integrally form the substrate 51 is used, the signal pattern 52 may be applied to the resin material.

A recording layer 53 is formed on the surface according to the 2P method. Although not shown in FIGS. 39 and 40, a signal pattern 52 having fine corrugations is formed on the surface.

The material for the recording layer 53 may be selected from the group composed of polymethyne dye, an anthraquinone dye, a cyanine dye, phthalocyanine dye, a xanthene dye, a triphenyl methane dye, pyrylium dye, an azulene dye, a metal containing azo dye and the like. In this embodiment, cyanine dye material is used, and the methanol solution of the cyanine dye is spin coated on the substrate to form a recording layer 53.

An indole type cyanine dye of cyanine type organic dyes which particularly has the following general formula is preferably used.

General formula

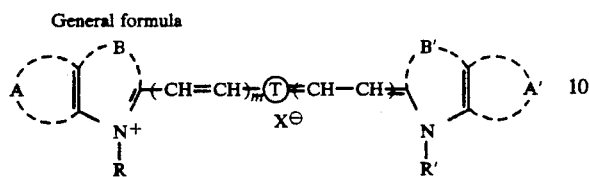

In the formula, (T) is a carbon chain to form a methyne chain and composed of a linear chain or polycylic compound of $C_3$–$C_{17}$, and a hydrogen atom attached to a carbon atom may be substituted by a halogen atom,

(R" is a linear chain of $C_1$–$C_6$ or an aromatic ring). A may be equal to or different from A' and both of them represent an aromatic ring, respectively. A hydrogen atom attached to a carbon atom may be substituted by —I, —Br, —Cl, —$C_nH_{2n+1}$ (n=1-12), —$OCH_3$,

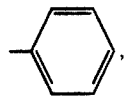

$NO_2$, and

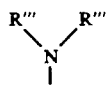

(R'" is a linear chain of a hydrocarbon or an aromatic ring).

B may be equal to or different from B' and both of them represent —O—, —S—, —Se—, —CH=CH—, or

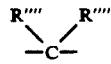

(R"" is an alkyl group of $C_1$–$C_4$ such as $CH_3$, $C_2H_5$, $C_3H_7$, and $C_4H_9$).

R may be equal to or different from R', both of them represent an alkyl group $C_1$–$C_{22}$ and may be substituted by a sulfonyl group or a carboxyl group.

$X^\ominus$ represents an anion containing $PF_6^\ominus$, $ClO_4^\ominus$, $I^\ominus$, $CF_3SO_3^\ominus$, $SCN^\ominus$ and the like.

m and n represent zero or integer of 1 through 3, respectively and have a relationship of m+n≦3.

The recording layer can be formed on the disc substrate through an undercoat or omitting the under coat by any method including a solution spin coating method, a vapor-deposition method or a laminating method by Langmuir-Blodgett or a suitable combination of these methods.

The preferable specific examples of the cyanine type organic dyes are as follows;

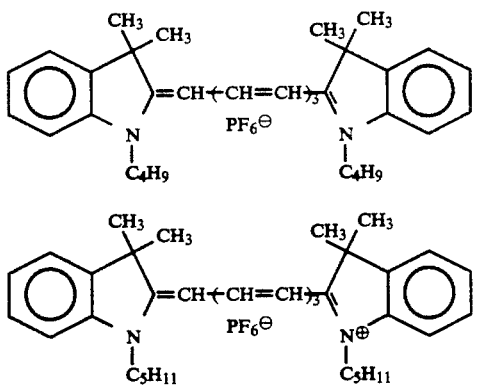

Reference numeral 54 denotes a thin layer of a water soluble resin (hydrophilic polymer material) formed on the recording layer 53 according to the spin coating method. For example, the following water-soluble resin may be used as the layer 54.
1. polyvinyl alcohol
2. polyethylene oxide
3. polyacrylic acid
4. polystrene-sodium-sulfonic acid
5. polyvinyl pyrolydone
6. polymethacrylic acid
7. polypropylene glycol
8. methyl cellulose
9. polyvinyl nitrate Also, the following thermoplastic synthetic resins can be used as the thin layer 54.
1. fluoro resin such as poly-tetra-fluoro ethylene; polychlorotrifluoroethylene; vinylidene fluoride; tetrafluoroethylene-hexafluoro-propylenecopolymer; vinylidene fluodide-hexafluoropropylenecopolymer; vinylidene fluoride-chlorotrifluoroethylenecopolymer; tetrafluoroethylene-perfluoroalkyl vinyl ether-copolymer; tetrafluoroethylene-ethylene copolymer and the like.
2. imide resin such as polyimide; polyamideimide; polyester-imide and the like.
3. amide resin such as nylon-6; nylon-11; nylon-12; nylon-66; nylon-610; mixture of nylon 610 and nylon 66 and the like.
4. ethylene resin such as polyethylene; cross-linked polyethylene; ethylene-acrylic acid ester copolymer; ionomer resin and the like.
5. polypropylene
6. styrene resin such as polystyrene; styrene-acrylonitrile copolymer; styrene-acrylonitrilebutadiene copolymer and the like.
7. polyvinyl chloride
8. polyvinylidene chloride
9. polyvinylidene acetate
10. polyvinyl acetal
11. polycarbonate
12. polyacetal
13. saturated polyester resin such as polyethylene-tetraphthalate; polybutylene-terephthalate and the like.
14. polyphenylene oxide
15. polysulfone Further, the following rubbers can be used as the thin layer 54.

1. dien rubber such as styrene-butadiene rubber; butadiene rubber; isoprene rubber; acrylo-nitrilebutadiene rubber; chloroprene rubber and the like.

2. olefine rubber such as butyl rubber; ethylene-propyrene rubber; acrylic rubber; chlorosulfonic polyethylene rubber; fluoro rubber and the like.

3. silicone rubber 4. urethane rubber 5. polysulfide rubber

In this embodiment, the polyvinyl alcohol (PVA) is used as a material for the thin layer 54, and the PVA solution is spin coated to form the thin layer 54 having a film thickness of 6 nm.

The formation of the thin layer 54 is performed by using the spinner coating apparatus 17 shown in FIG. 16a.

Incidentally, for the formation of the thin layer 54, the spinner coating apparatus 17 can be used under either condition of being made air-tight or opened to the atmosphere.

Figure 41:
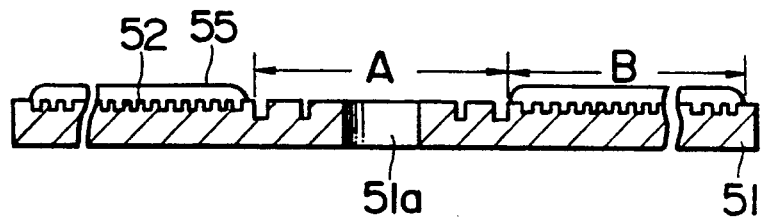
FIGS. 41 and 42 are a cross-sectional view and a plan view showing the spin coating condition.
Figure 42:
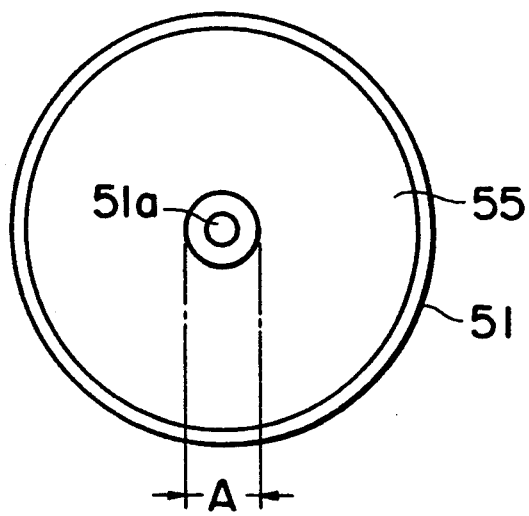

FIGS. 41 and 42 are a cross-sectional view and a plan view showing a transient condition of the spinner coating. As shown in FIG. 41, the coating liquid 55 is uniformly dropped over the entire region B of the recording area on the substrate 51 in order to form a thin layer 54.

The following four methods for dropping the coating liquid 55 over the entire region of the recording area B will now be described with reference to FIGS. 43 to 45. However, it is apparent that the methods of the present invention are not limited to those mentioned.

Figure 43:
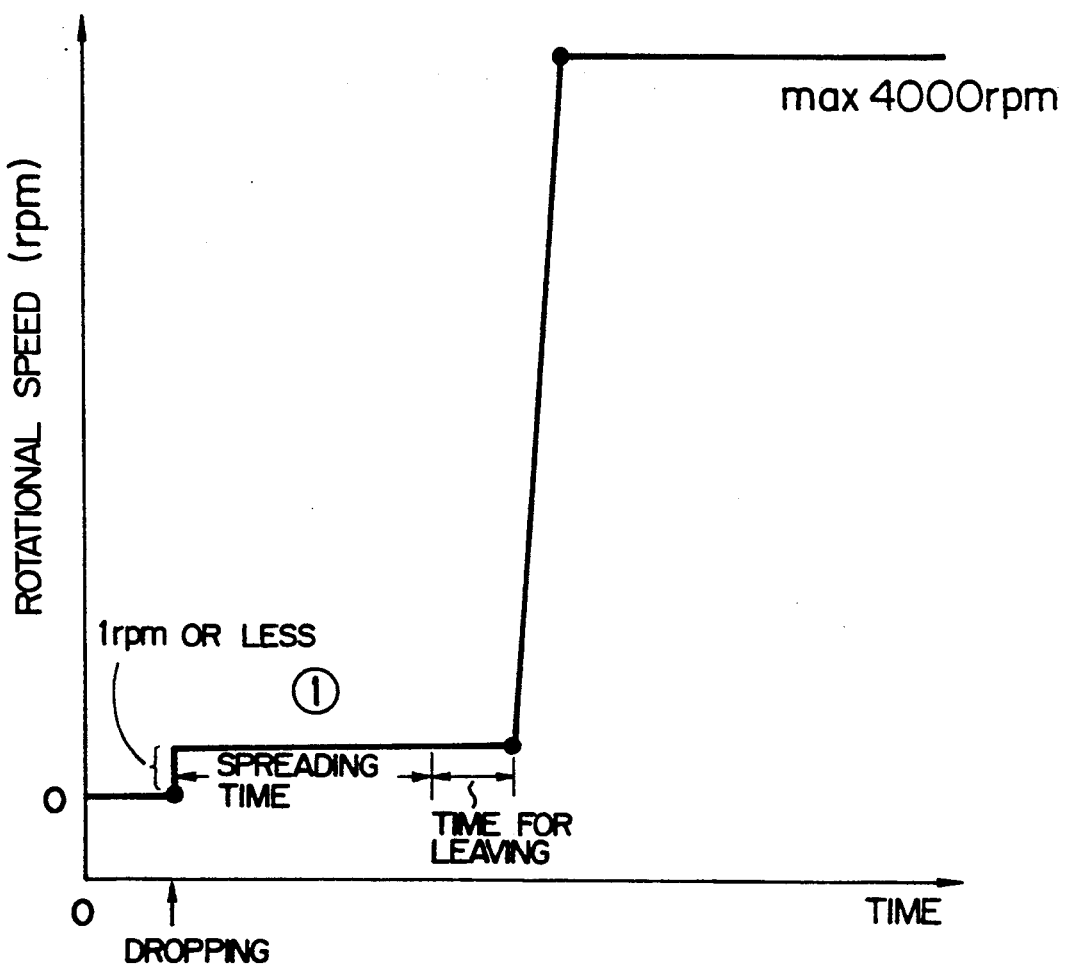
FIGS. 43, 44 and 45 are diagrams showing the respective coating modes in the spin coating.

First Method (FIG. 43)

First of all, the coating liquid 55 is dropped in a doughnut-shape onto an intermediate portion of the optical recording medium (however, outside of the clamping area A), and thereafter, the substrate is rotated at a low speed less than 1 rpm to spread the coating liquid 55 over the entire recording area B. Thereafter, the optical recording medium is rotated at a high speed (max. 4,000 rpm) to centrifugally remove an excess of the coating liquid 55 to form a layer.

Figure 44:
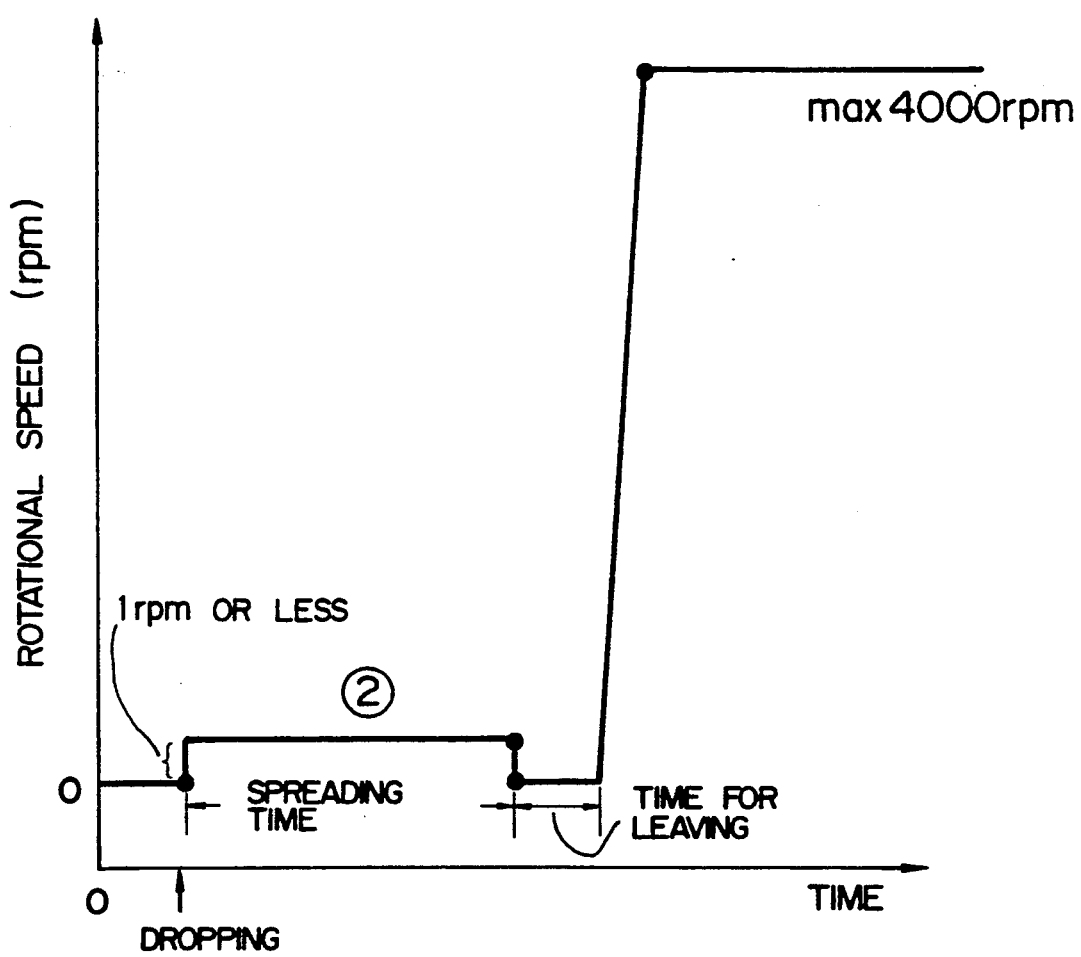

Second Method (FIG. 44)

First of all, the coating liquid 55 is dropped in the form of a doughnut shape onto the intermediate portion of the optical recording medium (however, outside of the clamping area A). Thereafter, the coating liquid 55 is spread over the entire region of the recording area B by rotating the optical recording medium at a low speed of 1 rpm of less. Thereafter, the optical recording medium is stopped for five seconds or more. Then, the optical recording medium is rotated at a high speed (max. 4,000 rpm) to thereby centrifugally remove the excess of coating liquid 55 to form a thin film.

Figure 45:
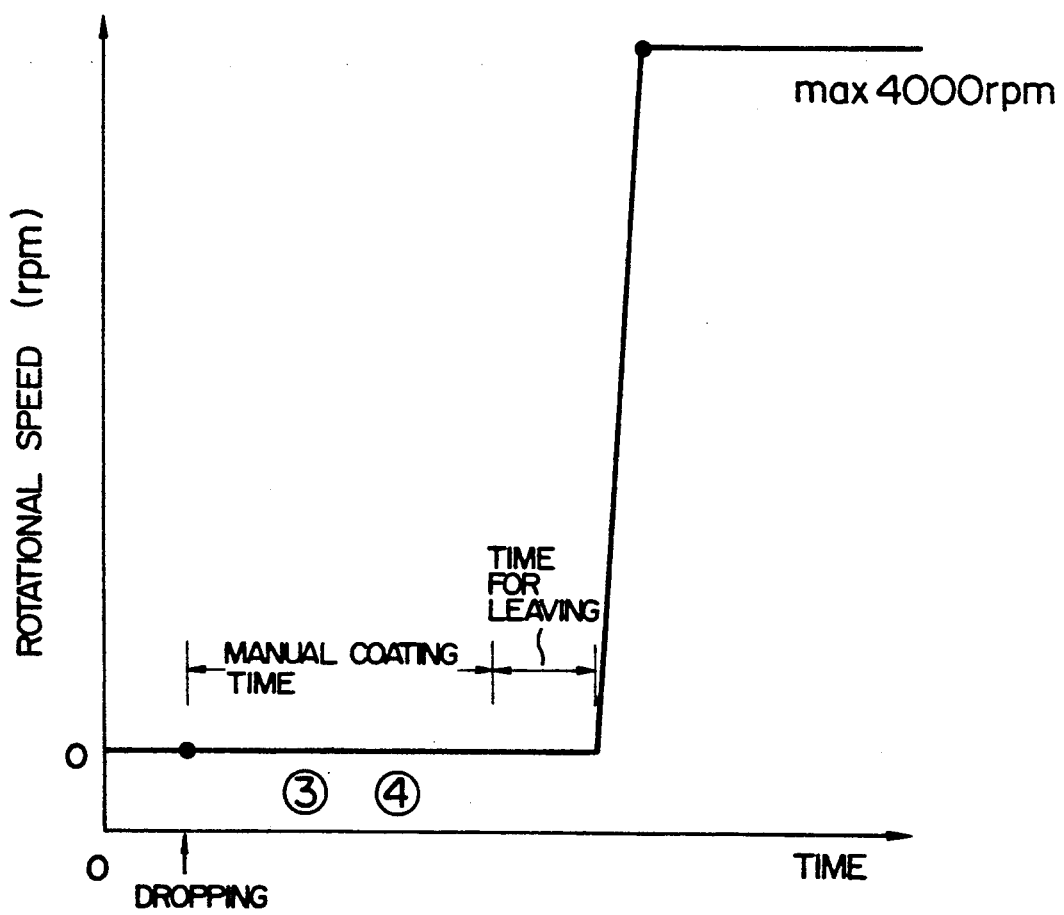

Third Method (FIG. 45)

After the optical recording medium is stopped, the nozzle is rotated to drop the coating liquid 55 over the entire region of the recording area B. Thereafter, the recording medium is rotated at a high speed to centrifugally remove an excess of coating liquid 55 to form a thin film.

Fourth Method (FIG. 45)

Under the condition wherein the optical medium is stopped, the coating liquid 55 is sprayed over the entire region of the recording area B in a spraying manner. Thereafter the optical recording medium is rotated at a high speed to centrifugally remove any excess of the recording liquid 55 to form a thin film.

However, the above-described thin layer 54 is made of water-soluble resin such as PVA. Therefore, its moisture-proof property is degraded. For this reason, the thin layer 54 is subjected to a cross-linking process to have water-proof (moisture-proof, moisture permeation proof) property, and heat-proof property. More specifically, cross-linking agents or the like are added to the water solution of the water-soluble resin to form a thin layer 54. Thereafter, the cross-linking reaction due to the light irradiation such as ultraviolet ray irradiation or the cross-linking reaction due to the heat is effected, or otherwise, the thin layer 54 which does not contain the cross-linking agents is subjected to a heat treatment for crystallization (by, for example, modified PVA since the PVA is used in the embodiment) to have water-proof and heat-proof properties.

However, the above-described cross-linking reaction is superior in productivity since it is unnecessary to pay attention to a thermally adverse effect to the substrate 51 and the recording layer 53. Therefore, in the embodiment, ammonium bichromate is added as a cross-linking agent, and the thin layer 54 is subjected to the cross-linking reaction by the irradiation of the light. The following specific cross-linking examples may be used as desired.

1. An addition, for example, of copper, boron, aluminum, titanium, zirconium, tin, vanadium, chrome and the like as an inorganic cross-linking agent.

Figure 46:
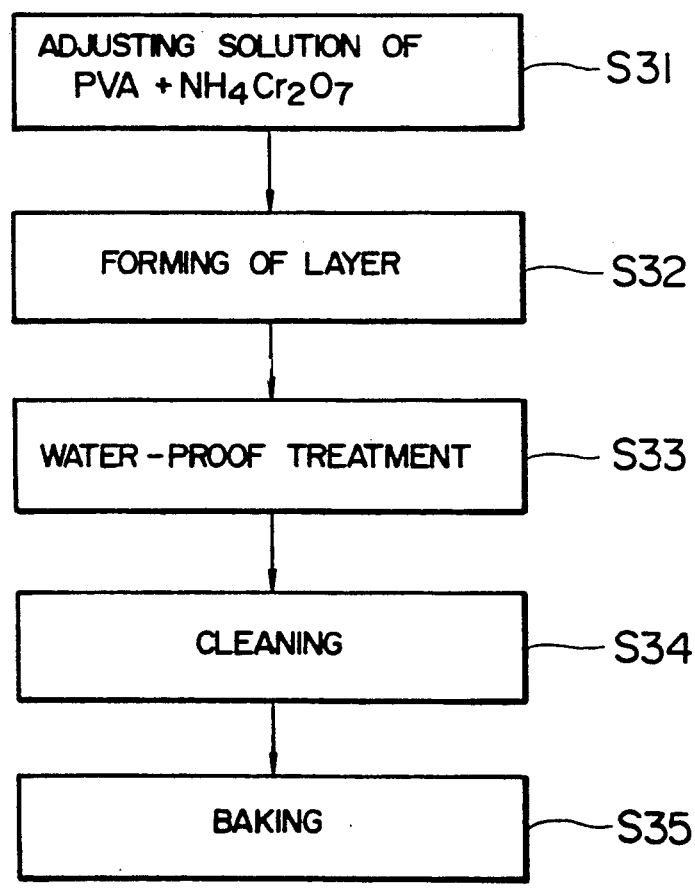
FIG. 46 is a flowchart showing a process after the thin film layer formation.

2. acetal formation with aldehydes 3. aldehyde formation of hydroxyl group 4. addition of activated vinyl compound 5. etherification with epoxide compound 6. reaction of dicarboxylic acid with acid catalyst 7. addition of succinic acid and sufluric acid 8. addition of triethylene glycol and methyl acrylate acid 9. blending of polyacrylic acid and methyl vinyl ether-maleic acid copolymer FIG. 46 is a flowchart showing a process after the thin layer formation in the embodiment of the invention.

S31: adjusting polyvinyl alcohol to which ammonium dichromate $((NH_4)_2Cr_2O_7)$ of a predetermined concentration is added as a cross-linking agent.

S32: forming a thin layer according to the spin coating.

S33: effecting a cross-linking reaction by the irradiation of the ultraviolet ray onto the thin layer, to impart a water-proof property to the thin layer.

S34: dropping cleaning agents from above the thin layer while rotating the substrate to clean and remove non-cross-linked portions and the cross-linking agents contained in the thin layer. As the cleaning agents, water, hot water, or organic liquid such as alcohols may be used solely or in combination (mixture).

S35: completing the production by baking the substrate at a temperature of 80° C. for one hour and half an hour.

The degradation in reflection factor between the case where the cleaning treatment is effected and the case where the cleaning treatment is not effected is shown in the following Table. Incidentally, the experiment was conducted in an atmosphere at 60° C. and 90% RH.

TABLE

| test time (H) | 0 | 300 | 500 | (unit: %) 800 |
|---|---|---|---|---|
| water cleaning | 100 | 96.5 | 95.8 | 95.4 |
| nowater cleaning | 100 | 73.8 | 69.8 | 66.7 |

As is apparent from the table, it will be understood that the cleaning treatment is effected to remove the cross-linking agents or non-cross-linked portions from the thin layer so that a high reflection factor may be maintained even under the condition at a high temperature and at a high humidity. In the case of no cleaning treatment, a cause of reduction in reflection factor at high temperature and high humidity is that, if any cross-linking agent or non-cross-linked portion resides in the thin layer, the thin layer is expanded due to the absorption of moisture to thereby deteriorate the contact between the recording layer and the thin layer.

In the foregoing embodiment, the explanation has been made as to the optical disc of the air sandwich type. It is apparent that the present invention is not limited thereto or thereby. For example, the invention may be applied to any other type such as a single plate type of a single optical disc, or to a contact type of two optical discs contacted together without any gap.

As described above, according to the present invention, by the provision of the gas flow suppression means, it is possible to provide an apparatus for producing an optical data recording medium having a uniform property without change in reflection factor and transparency of the recording layer.

Also, as described above, since the end portion of the nozzle is directed in the centrifugal direction, when the solution is dropped, a large amount of solution is spread in the centrifugal direction and a relatively small amount of solution is spread opposite to the centrifugal direction. Accordingly, the solution flow toward the outer periphery of the substrate is smooth to form a thin layer with a high uniformity in thickness.

Furthermore, as described above, by forming a liquid film over the entire region of the recording area of the substrate and stopping the substrate or rotating the substrate at a low speed, it is possible to fill the coating liquid into the recesses of the signal pattern. As a result, it is possible to produce a uniform thin layer in thickness without pin holes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for producing a data recording medium including a substrate and a coated recording layer, comprising:

a turn table for supporting a substrate for the purpose of forming a coating film on a planar surface thereof by spin coating whereby a liquid coating is applied to said planar surface of said substrate by a rotational force of said turn table;

means for suppressing gas flow to stabilize said spin coating, said gas flow suppressing means having a planar portion arranged so as to substantially confront said planar surface of said substrate to be coated, said gas flow suppressing means being larger in diameter or width than a diameter or width of said substrate so as to cover an entire planar surface thereof, said gas flow suppressing means being positioned apart from said planar surface of said substrate at a distance less than one and one half times said diameter or width of said substrate;

an air space formed above said planar surface of said substrate on said turn table and closed by said planar portion of said gas flow suppressing means, said air space being suppressible of gas flow along said planar surface of said substrate; and a nozzle for dropping said liquid coating onto said planar surface of said substrate, said nozzle having at least an open end portion arranged between said gas flow suppressing means and said substrate at a position above an inner circumferential portion of said substrate, said end portion of said nozzle being inclined so as to form an angle less than 90 degrees relative to said substrate as viewed from a side of said nozzle.

2. An apparatus for producing a data recording medium including a substrate and a coated recording layer, comprising:

a turn table for supporting a substrate for the purpose of forming a coating film on a planar surface thereof by spin coating whereby a liquid coating is applied to said planar surface of said substrate by a rotational force of said turn table;

means for suppressing gas flow to stabilize said spin coating, said gas flow suppressing means having a planar portion arranged so as to substantially confront said planar surface of said substrate to be coated, said gas flow suppressing means being large in diameter or width than a diameter or width of said substrate so as to cover an entire planar surface thereof, said gas flow suppressing means being positioned apart from said planar surface of said substrate at a distance less than one and one half times said diameter or width of said substrate;

an air space formed above said planar surface of said substrate on said turn table and closed by said planar portion of said gas flow suppressing means, said air space being suppressible of gas flow along said planar surface of said substrate;

a nozzle for dropping said liquid coating onto said planar surface of said substrate, said nozzle having at least an open end portion arranged between said gas flow suppressing means and said substrate at a position above an inner circumferential portion of said substrate, said end portion of said nozzle being inclined so as to form an angle less than 90 degrees relative to said substrate as viewed from a side of said nozzle; and a housing containing turn table, said substrate, said gas flow suppressing means and said nozzle.

3. The apparatus according to claim 1, further comprising a housing in which said turn table for supporting said substrate is incorporated, wherein said gas flow suppressing means comprises a top ceiling of said housing.

4. The apparatus according to claim 1, further comprising a housing in which said turn table for supporting said substrate is incorporated, wherein said gas flow suppressing means comprises a lid of said housing.

5. The apparatus according to claim 1, wherein said end portion of said nozzle is provided with a liquid drop preventing means.

6. The apparatus according to claim 2, wherein an interior of said housing is substantially shut off from an outer atmosphere by said housing.

7. The apparatus according to claim 5, wherein said liquid drop preventing means includes a first portion of said end portion of said nozzle in confronted relation with said substrate and an opposite second portion to said first portion, said end portion being formed in a slant shape so that said first portion is longer than said second portion.

8. The apparatus according to claim 5, wherein said liquid drop preventing means includes a portion of said end portion of said nozzle in confronted relation with said substrate, said portion having a through-hole or a recess.

* * * * *